United States Patent
Hebebrand et al.

(10) Patent No.: US 10,626,683 B2
(45) Date of Patent: Apr. 21, 2020

(54) TOOL IDENTIFICATION

(71) Applicant: Weatherford Technology Holdings, LLC, Houston, TX (US)

(72) Inventors: Christina Karin Hebebrand, Hannover (DE); Bjoern Thiemann, Burgwedel (DE); Martin Liess, Seelze (DE); Frank Wern, Hannover (DE); Aicam Zouhair, Houston, TX (US); John Fielding Ownby, Houston, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 523 days.

(21) Appl. No.: 15/004,687

(22) Filed: Jan. 22, 2016

(65) Prior Publication Data

US 2017/0044875 A1 Feb. 16, 2017

Related U.S. Application Data

(60) Provisional application No. 62/203,712, filed on Aug. 11, 2015.

(51) Int. Cl.
*E21B 19/00* (2006.01)
*E21B 17/00* (2006.01)
(Continued)

(52) U.S. Cl.
CPC ............... *E21B 19/00* (2013.01); *E21B 3/02* (2013.01); *E21B 17/006* (2013.01); *E21B 19/02* (2013.01);
(Continued)

(58) Field of Classification Search
CPC . E21B 7/06; E21B 19/00; E21B 19/02; E21B 19/04; E21B 19/06; E21B 19/07;
(Continued)

(56) References Cited

U.S. PATENT DOCUMENTS 1,367,156 A 2/1921 McAlvay et al.
1,610,977 A 12/1926 Scott
(Continued)

FOREIGN PATENT DOCUMENTS

AU 2012201644 A1 4/2012
AU 2013205714 A1 5/2013
(Continued)

OTHER PUBLICATIONS

PCT International Search Report and Written Opinion dated Dec. 14, 2016, for International Patent Application No. PCT/US2016/046458.
(Continued)

*Primary Examiner* — Tara E Schimpf
(74) *Attorney, Agent, or Firm* — Patterson + Sheridan, LLP

(57) ABSTRACT

A modular top drive system for construction of a wellbore includes an identification reader for automatically identifying tools during operation for rig up and tool exchange. The identification reader may be disposed in one of a tool storage unit, a tool change unit or a top drive unit. Drilling tools, cementing tools and casing tools with one or more identification devices may be used with the modular top drive system. The one or more identification devices may be radio frequency identification devices, barcodes, text tags, microcontrollers, or combinations thereof.

20 Claims, 18 Drawing Sheets

(51) Int. Cl.
*E21B 19/02* (2006.01)
*E21B 19/14* (2006.01)
*E21B 3/02* (2006.01)
*E21B 41/00* (2006.01)
*E21B 19/07* (2006.01)
*E21B 19/04* (2006.01)
*E21B 19/06* (2006.01)
*G06K 7/10* (2006.01)

(52) U.S. Cl.
CPC .......... *E21B 19/14* (2013.01); *E21B 41/0092* (2013.01); *E21B 19/04* (2013.01); *E21B 19/06* (2013.01); *E21B 19/07* (2013.01); *G06K 7/10366* (2013.01)

(58) Field of Classification Search
CPC ........ E21B 19/14; E21B 19/146; E21B 44/00; F03B 13/02
See application file for complete search history.

(56) References Cited

U.S. PATENT DOCUMENTS

| | | |
|---|---|---|
| 1,822,444 A | 9/1931 | MacClatchie |
| 1,853,299 A | 4/1932 | Carroll |
| 2,370,354 A | 2/1945 | Hurst |
| 2,683,379 A | 7/1954 | Strandgren |
| 3,147,992 A | 9/1964 | Haeber et al. |
| 3,354,951 A | 11/1967 | Savage et al. |
| 3,385,370 A | 5/1968 | Knox et al. |
| 3,662,842 A | 5/1972 | Bromell |
| 3,698,426 A | 10/1972 | Litchfield et al. |
| 3,747,675 A | 7/1973 | Brown |
| 3,766,991 A | 10/1973 | Brown |
| 3,774,697 A | 11/1973 | Brown |
| 3,776,320 A | 12/1973 | Brown |
| 3,842,619 A | 10/1974 | Bychurch, Sr. |
| 3,888,318 A | 6/1975 | Brown |
| 3,899,024 A | 8/1975 | Tonnelli et al. |
| 3,913,687 A | 10/1975 | Gyongyosi et al. |
| 3,915,244 A | 10/1975 | Brown |
| 3,917,092 A | 11/1975 | McGinnis |
| 3,964,552 A | 6/1976 | Slator |
| 4,022,284 A | 5/1977 | Crow |
| 4,051,587 A | 10/1977 | Boyadjieff |
| 4,100,968 A | 7/1978 | Delano |
| 4,192,155 A | 3/1980 | Gray |
| 4,199,847 A | 4/1980 | Owens |
| 4,235,469 A | 11/1980 | Denny et al. |
| 4,364,407 A | 12/1982 | Hilliard |
| 4,377,179 A | 3/1983 | Giebeler |
| 4,402,239 A | 9/1983 | Mooney |
| 4,406,324 A | 9/1983 | Baugh et al. |
| 4,449,596 A | 5/1984 | Boyadjieff |
| 4,478,244 A | 10/1984 | Garrett |
| 4,497,224 A | 2/1985 | Jurgens |
| 4,593,773 A | 6/1986 | Skeie |
| 4,599,046 A | 7/1986 | James |
| 4,647,050 A | 3/1987 | Johnson |
| 4,762,187 A | 8/1988 | Haney |
| 4,776,617 A | 10/1988 | Sato |
| 4,779,688 A | 10/1988 | Baugh |
| 4,791,997 A | 12/1988 | Krasnov |
| 4,813,493 A | 3/1989 | Shaw et al. |
| 4,815,546 A | 3/1989 | Haney et al. |
| 4,821,814 A | 4/1989 | Willis et al. |
| 4,844,181 A | 7/1989 | Bassinger |
| 4,867,236 A | 9/1989 | Haney et al. |
| 4,916,959 A | 4/1990 | Lively |
| 4,932,253 A | 6/1990 | McCoy |
| 4,955,949 A | 9/1990 | Bailey et al. |
| 4,962,819 A | 10/1990 | Bailey et al. |
| 4,972,741 A | 11/1990 | Sibille |
| 4,981,180 A | 1/1991 | Price |
| 4,997,042 A | 3/1991 | Jordan et al. |
| 5,018,350 A | 5/1991 | Bender |
| 5,020,640 A | 6/1991 | Nederbragt |
| 5,036,927 A | 8/1991 | Willis |
| 5,099,725 A | 3/1992 | Bouligny, Jr. et al. |
| 5,152,554 A | 10/1992 | LaFleur et al. |
| 5,172,940 A | 12/1992 | Usui et al. |
| 5,191,939 A | 3/1993 | Stokley |
| 5,196,770 A | 3/1993 | Champs et al. |
| 5,215,153 A | 6/1993 | Younes |
| 5,245,877 A | 9/1993 | Ruark |
| 5,282,653 A | 2/1994 | LaFleur et al. |
| 5,297,833 A | 3/1994 | Willis et al. |
| 5,348,351 A | 9/1994 | LaFleur et al. |
| 5,385,514 A | 1/1995 | Dawe |
| 5,404,767 A | 4/1995 | Sutherland |
| 5,433,279 A | 7/1995 | Tessari et al. |
| 5,440,183 A | 8/1995 | Denne |
| 5,441,310 A | 8/1995 | Barrett et al. |
| 5,456,320 A | 10/1995 | Baker |
| 5,479,988 A | 1/1996 | Appleton |
| 5,486,223 A | 1/1996 | Carden |
| 5,501,280 A | 3/1996 | Brisco |
| 5,509,442 A | 4/1996 | Claycomb |
| 5,540,095 A | 7/1996 | Sherman et al. |
| 5,577,566 A | 11/1996 | Albright et al. |
| 5,584,343 A | 12/1996 | Coone |
| 5,645,131 A | 7/1997 | Trevisani |
| 5,664,310 A | 9/1997 | Penisson |
| 5,682,952 A | 11/1997 | Stokley |
| 5,735,348 A | 4/1998 | Hawkins, III |
| 5,778,742 A | 7/1998 | Stuart |
| 5,839,330 A | 11/1998 | Stokka |
| 5,909,768 A | 6/1999 | Castille et al. |
| 5,918,673 A | 7/1999 | Hawkins et al. |
| 5,950,724 A | 9/1999 | Giebeler |
| 5,971,079 A | 10/1999 | Mullins |
| 5,992,520 A | 11/1999 | Schultz et al. |
| 6,003,412 A | 12/1999 | Dlask et al. |
| 6,011,508 A | 1/2000 | Perreault et al. |
| 6,053,191 A | 4/2000 | Hussey |
| 6,101,952 A | 8/2000 | Thornton et al. |
| 6,102,116 A | 8/2000 | Giovanni |
| 6,142,545 A | 11/2000 | Penman et al. |
| 6,161,617 A | 12/2000 | Gjedebo |
| 6,173,777 B1 | 1/2001 | Mullins |
| 6,276,450 B1 | 8/2001 | Seneviratne |
| 6,279,654 B1 | 8/2001 | Mosing et al. |
| 6,289,911 B1 | 9/2001 | Majkovic |
| 6,309,002 B1 | 10/2001 | Bouligny |
| 6,311,792 B1 | 11/2001 | Scott et al. |
| 6,328,343 B1 | 12/2001 | Hosie et al. |
| 6,378,630 B1 | 4/2002 | Ritorto et al. |
| 6,390,190 B2 | 5/2002 | Mullins |
| 6,401,811 B1 | 6/2002 | Coone |
| 6,415,862 B1 | 7/2002 | Mullins |
| 6,431,626 B1 | 8/2002 | Bouligny |
| 6,443,241 B1 | 9/2002 | Juhasz et al. |
| 6,460,620 B1 | 10/2002 | LaFleur |
| 6,499,701 B1 | 12/2002 | Thornton et al. |
| 6,508,132 B1 | 1/2003 | Lohr et al. |
| 6,527,047 B1 | 3/2003 | Pietras |
| 6,536,520 B1 | 3/2003 | Snider et al. |
| 6,571,876 B2 | 6/2003 | Szarka |
| 6,578,495 B1 | 6/2003 | Yitts et al. |
| 6,578,632 B2 | 6/2003 | Mullins |
| 6,591,471 B1 | 7/2003 | Hollingsworth et al. |
| 6,595,288 B2 | 7/2003 | Mosing et al. |
| 6,604,578 B2 | 8/2003 | Mullins |
| 6,606,569 B1 | 8/2003 | Potts |
| 6,622,796 B1 | 9/2003 | Pietras |
| 6,637,526 B2 | 10/2003 | Juhasz et al. |
| 6,640,824 B2 | 11/2003 | Majkovic |
| 6,666,273 B2 | 12/2003 | Laurel |
| 6,675,889 B1 | 1/2004 | Mullins et al. |
| 6,679,333 B2 | 1/2004 | York et al. |
| 6,688,398 B2 | 2/2004 | Pietras |
| 6,691,801 B2 | 2/2004 | Juhasz et al. |
| 6,705,405 B1 | 3/2004 | Pietras |
| 6,715,542 B2 | 4/2004 | Mullins |

(56) References Cited

U.S. PATENT DOCUMENTS

| | | |
|---|---|---|
| 6,719,046 B2 | 4/2004 | Mullins |
| 6,722,425 B2 | 4/2004 | Mullins |
| 6,725,938 B1 | 4/2004 | Pietras |
| 6,732,819 B2 | 5/2004 | Wenzel |
| 6,732,822 B2 | 5/2004 | Slack et al. |
| 6,742,584 B1 | 6/2004 | Appleton |
| 6,742,596 B2 | 6/2004 | Haugen |
| 6,770,004 B1 | 8/2004 | Lofgren et al. |
| 6,779,599 B2 | 8/2004 | Mullins et al. |
| 6,832,656 B2 | 12/2004 | Fournier, Jr. et al. |
| 6,851,476 B2 | 2/2005 | Gray et al. |
| 6,883,605 B2 | 4/2005 | Arceneaux et al. |
| 6,892,835 B2 | 5/2005 | Shahin et al. |
| 6,908,121 B2 | 6/2005 | Hirth et al. |
| 6,925,807 B2 | 8/2005 | Jones et al. |
| 6,938,697 B2 | 9/2005 | Haugen |
| 6,976,298 B1 | 12/2005 | Pietras |
| 6,983,701 B2 | 1/2006 | Thornton et al. |
| 6,994,176 B2 | 2/2006 | Shahin et al. |
| 7,000,503 B2 | 2/2006 | Dagenais et al. |
| 7,001,065 B2 | 2/2006 | Dishaw et al. |
| 7,004,259 B2 | 2/2006 | Pietras |
| 7,007,753 B2 | 3/2006 | Robichaux et al. |
| 7,017,671 B2 | 3/2006 | Williford |
| 7,021,374 B2 | 4/2006 | Pietras |
| 7,025,130 B2 | 4/2006 | Bailey et al. |
| 7,073,598 B2 | 7/2006 | Haugen |
| 7,090,021 B2 | 8/2006 | Pietras |
| 7,096,948 B2 | 8/2006 | Mosing et al. |
| 7,114,235 B2 | 10/2006 | Jansch et al. |
| 7,128,161 B2 | 10/2006 | Pietras |
| 7,137,454 B2 | 11/2006 | Pietras |
| 7,140,443 B2 | 11/2006 | Beierbach et al. |
| 7,143,849 B2 | 12/2006 | Shahin et al. |
| 7,147,254 B2 | 12/2006 | Niven et al. |
| 7,159,654 B2 | 1/2007 | Ellison et al. |
| 7,178,600 B2 | 2/2007 | Luke et al. |
| 7,178,612 B2 | 2/2007 | Belik |
| 7,213,656 B2 | 5/2007 | Pietras |
| 7,219,744 B2 | 5/2007 | Pietras |
| 7,231,969 B2 | 6/2007 | Folk et al. |
| 7,270,189 B2 | 9/2007 | Brown et al. |
| 7,281,451 B2 | 10/2007 | Schulze Beckinghausen |
| 7,281,587 B2 | 10/2007 | Haugen |
| 7,290,476 B1 | 11/2007 | Glasson |
| 7,303,022 B2 | 12/2007 | Tilton et al. |
| 7,325,610 B2 | 2/2008 | Giroux et al. |
| 7,353,880 B2 | 4/2008 | Pietras |
| 7,373,971 B2 | 5/2008 | Montgomery |
| 7,448,456 B2 | 11/2008 | Shahin et al. |
| 7,451,826 B2 | 11/2008 | Pietras |
| 7,490,677 B2 | 2/2009 | Buytaert et al. |
| 7,503,397 B2 | 3/2009 | Giroux et al. |
| 7,509,722 B2 | 3/2009 | Shahin et al. |
| 7,513,300 B2 | 4/2009 | Pietras et al. |
| 7,530,799 B2 | 5/2009 | Smith |
| 7,579,941 B2 | 8/2009 | Cleveland et al. |
| 7,591,304 B2 | 9/2009 | Juhasz et al. |
| 7,617,866 B2 | 11/2009 | Pietras |
| 7,635,026 B2 | 12/2009 | Mosing et al. |
| 7,665,515 B2 | 2/2010 | Mullins |
| 7,665,530 B2 | 2/2010 | Wells et al. |
| 7,665,531 B2 | 2/2010 | Pietras |
| 7,669,662 B2 | 3/2010 | Pietras |
| 7,690,422 B2 | 4/2010 | Swietlik et al. |
| 7,694,730 B2 | 4/2010 | Angman |
| 7,694,744 B2 | 4/2010 | Shahin |
| 7,699,121 B2 | 4/2010 | Juhasz et al. |
| 7,712,523 B2 | 5/2010 | Snider et al. |
| 7,730,698 B1 | 6/2010 | Montano et al. |
| 7,757,759 B2 | 7/2010 | Jahn et al. |
| 7,779,922 B1 | 8/2010 | Harris et al. |
| 7,793,719 B2 | 9/2010 | Snider et al. |
| 7,817,062 B1 | 10/2010 | Li et al. |
| 7,828,085 B2 | 11/2010 | Kuttel et al. |
| 7,841,415 B2 | 11/2010 | Winter |
| 7,854,265 B2 | 12/2010 | Zimmermann |
| 7,857,043 B2 | 12/2010 | Ali-zada |
| 7,866,390 B2 | 1/2011 | Latiolais, Jr. et al. |
| 7,874,352 B2 | 1/2011 | Odell, II et al. |
| 7,874,361 B2 | 1/2011 | Mosing et al. |
| 7,878,237 B2 | 2/2011 | Angman |
| 7,878,254 B2 | 2/2011 | Abdollahi et al. |
| 7,882,902 B2 | 2/2011 | Boutwell, Jr. |
| 7,896,084 B2 | 3/2011 | Haugen |
| 7,918,273 B2 | 4/2011 | Snider et al. |
| 7,958,787 B2 | 6/2011 | Hunter |
| 7,971,637 B2 | 7/2011 | Duhon et al. |
| 7,975,768 B2 | 7/2011 | Fraser et al. |
| 8,036,829 B2 | 10/2011 | Gibbs et al. |
| 8,118,106 B2 | 2/2012 | Wiens et al. |
| 8,141,642 B2 | 3/2012 | Olstad et al. |
| 8,210,268 B2 | 7/2012 | Heidecke et al. |
| 8,256,579 B2 | 9/2012 | Jia |
| 8,281,856 B2 | 10/2012 | Jahn et al. |
| 8,307,903 B2 | 11/2012 | Redlinger et al. |
| 8,328,527 B2 | 12/2012 | Ehimeakhe |
| 8,365,834 B2 | 2/2013 | Liess et al. |
| 8,459,361 B2 | 6/2013 | Leuchtenberg |
| 8,505,984 B2 | 8/2013 | Henderson et al. |
| 8,567,512 B2 | 10/2013 | Odell, II et al. |
| 8,601,910 B2 | 12/2013 | Begnaud |
| 8,616,134 B2 | 12/2013 | King et al. |
| 8,624,699 B2 | 1/2014 | Hunter et al. |
| 8,636,067 B2 | 1/2014 | Robichaux et al. |
| 8,651,175 B2 | 2/2014 | Fallen |
| 8,668,003 B2 | 3/2014 | Osmundsen et al. |
| 8,708,055 B2 | 4/2014 | Liess et al. |
| 8,727,021 B2 | 5/2014 | Heidecke et al. |
| 8,776,898 B2 | 7/2014 | Liess et al. |
| 8,783,339 B2 | 7/2014 | Sinclair et al. |
| 8,839,884 B2 | 9/2014 | Kuttel et al. |
| 8,849,954 B2 | 9/2014 | Kim |
| 8,851,860 B1 | 10/2014 | Mail |
| 8,858,187 B2 | 10/2014 | Lane |
| 8,893,772 B2 | 11/2014 | Henderson et al. |
| 9,068,406 B2 | 6/2015 | Clasen et al. |
| 9,206,851 B2 | 12/2015 | Slaughter, Jr. et al. |
| 9,528,326 B2 | 12/2016 | Heidecke et al. |
| 9,631,438 B2 | 4/2017 | McKay |
| 10,197,050 B2 | 2/2019 | Robison et al. |
| 2001/0021347 A1 | 9/2001 | Mills |
| 2002/0043403 A1 | 4/2002 | Juhasz et al. |
| 2002/0074132 A1 | 6/2002 | Juhasz et al. |
| 2002/0084069 A1 | 7/2002 | Mosing et al. |
| 2002/0129934 A1 | 9/2002 | Mullins et al. |
| 2002/0170720 A1 | 11/2002 | Haugen |
| 2003/0098150 A1 | 5/2003 | Andreychuk |
| 2003/0107260 A1 | 6/2003 | Ording et al. |
| 2003/0221519 A1 | 12/2003 | Haugen |
| 2004/0003490 A1 | 1/2004 | Shahin et al. |
| 2004/0069497 A1 | 4/2004 | Jones et al. |
| 2004/0216924 A1 | 11/2004 | Pietras et al. |
| 2005/0000691 A1 | 1/2005 | Giroux et al. |
| 2005/0173154 A1 | 8/2005 | Lesko |
| 2005/0206163 A1 | 9/2005 | Guesnon et al. |
| 2005/0238496 A1 | 10/2005 | Mills |
| 2005/0257933 A1 | 11/2005 | Pietras |
| 2005/0269072 A1 | 12/2005 | Folk et al. |
| 2005/0269104 A1 | 12/2005 | Folk et al. |
| 2005/0269105 A1 | 12/2005 | Pietras |
| 2005/0274508 A1 | 12/2005 | Folk et al. |
| 2006/0024177 A1 | 2/2006 | Robison et al. |
| 2006/0037784 A1 | 2/2006 | Walter et al. |
| 2006/0124353 A1 | 6/2006 | Juhasz et al. |
| 2006/0151181 A1 | 7/2006 | Shahin |
| 2006/0180315 A1 | 8/2006 | Shahin et al. |
| 2006/0233650 A1 | 10/2006 | Zhou |
| 2007/0030167 A1 | 2/2007 | Li et al. |
| 2007/0044973 A1 | 3/2007 | Fraser et al. |
| 2007/0074588 A1 | 4/2007 | Harata et al. |
| 2007/0074874 A1 | 4/2007 | Richardson |
| 2007/0102992 A1 | 5/2007 | Jager |
| 2007/0131416 A1 | 6/2007 | Odell et al. |

(56) References Cited

U.S. PATENT DOCUMENTS

| | | |
|---|---|---|
| 2007/0140801 A1 | 6/2007 | Kuttel et al. |
| 2007/0144730 A1 | 6/2007 | Shahin et al. |
| 2007/0158076 A1 | 7/2007 | Hollingsworth et al. |
| 2007/0251699 A1 | 11/2007 | Wells et al. |
| 2007/0251701 A1 | 11/2007 | Jahn et al. |
| 2007/0257811 A1 | 11/2007 | Hall et al. |
| 2008/0018603 A1 | 1/2008 | Baraz et al. |
| 2008/0059073 A1 | 3/2008 | Giroux et al. |
| 2008/0093127 A1 | 4/2008 | Angman |
| 2008/0099196 A1 | 5/2008 | Latiolais et al. |
| 2008/0125876 A1 | 5/2008 | Boutwell |
| 2008/0202812 A1 | 8/2008 | Childers et al. |
| 2008/0308281 A1 | 12/2008 | Boutwell, Jr. et al. |
| 2009/0151934 A1 | 6/2009 | Heidecke et al. |
| 2009/0159294 A1 | 6/2009 | Abdollahi et al. |
| 2009/0200038 A1 | 8/2009 | Swietlik et al. |
| 2009/0205820 A1 | 8/2009 | Koederitz et al. |
| 2009/0205827 A1 | 8/2009 | Swietlik et al. |
| 2009/0205836 A1 | 8/2009 | Swietlik et al. |
| 2009/0205837 A1 | 8/2009 | Swietlik et al. |
| 2009/0229837 A1 | 9/2009 | Wiens et al. |
| 2009/0266532 A1 | 10/2009 | Revheim et al. |
| 2009/0272537 A1 | 11/2009 | Alikin et al. |
| 2009/0274544 A1 | 11/2009 | Liess |
| 2009/0274545 A1 | 11/2009 | Liess et al. |
| 2009/0316528 A1 | 12/2009 | Ramshaw et al. |
| 2009/0321086 A1 | 12/2009 | Zimmermann |
| 2010/0032162 A1 | 2/2010 | Olstad et al. |
| 2010/0065336 A1* | 3/2010 | Wells .................. E21B 19/16 |
| | | 175/220 |
| 2010/0101805 A1 | 4/2010 | Angelle et al. |
| 2010/0200222 A1 | 8/2010 | Robichaux et al. |
| 2010/0206552 A1 | 8/2010 | Wollum |
| 2010/0206583 A1 | 8/2010 | Swietlik et al. |
| 2010/0206584 A1 | 8/2010 | Clubb et al. |
| 2010/0236777 A1 | 9/2010 | Partouche et al. |
| 2011/0036586 A1 | 2/2011 | Hart et al. |
| 2011/0039086 A1 | 2/2011 | Graham et al. |
| 2011/0088495 A1 | 4/2011 | Buck et al. |
| 2011/0214919 A1 | 9/2011 | McClung, III |
| 2011/0280104 A1 | 11/2011 | McClung, III |
| 2012/0020808 A1 | 1/2012 | Lawson et al. |
| 2012/0048574 A1 | 3/2012 | Wiens et al. |
| 2012/0152530 A1 | 6/2012 | Wiedecke et al. |
| 2012/0160517 A1 | 6/2012 | Bouligny et al. |
| 2012/0212326 A1 | 8/2012 | Christiansen et al. |
| 2012/0230841 A1 | 9/2012 | Gregory et al. |
| 2012/0234107 A1 | 9/2012 | Pindiprolu et al. |
| 2012/0273192 A1* | 11/2012 | Schmidt .............. E21B 47/122 |
| | | 166/250.1 |
| 2012/0298376 A1 | 11/2012 | Twardowski |
| 2013/0038144 A1 | 2/2013 | McAleese et al. |
| 2013/0045116 A1 | 2/2013 | Wang et al. |
| 2013/0055858 A1 | 3/2013 | Richardson |
| 2013/0056977 A1 | 3/2013 | Henderson et al. |
| 2013/0062074 A1 | 3/2013 | Angelle et al. |
| 2013/0075077 A1 | 3/2013 | Henderson et al. |
| 2013/0075106 A1 | 3/2013 | Tran et al. |
| 2013/0105178 A1 | 5/2013 | Pietras |
| 2013/0186638 A1 | 7/2013 | Filippov et al. |
| 2013/0207382 A1 | 8/2013 | Robichaux |
| 2013/0207388 A1 | 8/2013 | Jansson et al. |
| 2013/0213669 A1 | 8/2013 | Kriesels et al. |
| 2013/0233624 A1 | 9/2013 | In |
| 2013/0269926 A1 | 10/2013 | Liess et al. |
| 2013/0271576 A1 | 10/2013 | Ellis |
| 2013/0275100 A1* | 10/2013 | Ellis .................. G06F 17/5009 |
| | | 703/2 |
| 2013/0299247 A1 | 11/2013 | Kuttel et al. |
| 2014/0050522 A1 | 2/2014 | Slaughter, Jr. et al. |
| 2014/0069720 A1 | 3/2014 | Gray |
| 2014/0090856 A1 | 4/2014 | Pratt et al. |
| 2014/0116686 A1 | 5/2014 | Odell, II et al. |
| 2014/0131052 A1 | 5/2014 | Richardson |
| 2014/0202767 A1 | 7/2014 | Feasey |
| 2014/0233804 A1 | 8/2014 | Gustavsson et al. |
| 2014/0262521 A1 | 9/2014 | Bradley et al. |
| 2014/0305662 A1 | 10/2014 | Giroux et al. |
| 2014/0312716 A1 | 10/2014 | Hunter et al. |
| 2014/0326468 A1 | 11/2014 | Heidecke et al. |
| 2014/0352944 A1 | 12/2014 | Devarajan et al. |
| 2014/0360780 A1 | 12/2014 | Moss et al. |
| 2015/0014063 A1 | 1/2015 | Simanjuntak et al. |
| 2015/0053424 A1 | 2/2015 | Wiens et al. |
| 2015/0083391 A1 | 3/2015 | Bangert et al. |
| 2015/0107385 A1 | 4/2015 | Mullins et al. |
| 2015/0218894 A1 | 8/2015 | Slack |
| 2015/0292307 A1 | 10/2015 | Best |
| 2015/0337648 A1 | 11/2015 | Zippel et al. |
| 2016/0024862 A1 | 1/2016 | Wilson et al. |
| 2016/0138348 A1 | 5/2016 | Kunec |
| 2016/0145954 A1 | 5/2016 | Helms et al. |
| 2016/0177639 A1 | 6/2016 | McIntosh et al. |
| 2016/0201664 A1 | 7/2016 | Robison et al. |
| 2016/0215592 A1 | 7/2016 | Helms et al. |
| 2016/0230481 A1 | 8/2016 | Misson et al. |
| 2016/0245276 A1 | 8/2016 | Robison et al. |
| 2016/0342916 A1* | 11/2016 | Arceneaux ....... G06Q 10/06313 |
| 2016/0376863 A1 | 12/2016 | Older et al. |
| 2017/0037683 A1 | 2/2017 | Heidecke et al. |
| 2017/0044854 A1 | 2/2017 | Hebebrand et al. |
| 2017/0044875 A1 | 2/2017 | Hebebrand et al. |
| 2017/0051568 A1 | 2/2017 | Wern et al. |
| 2017/0067303 A1 | 3/2017 | Thiemann et al. |
| 2017/0067320 A1 | 3/2017 | Zouhair et al. |
| 2017/0074075 A1 | 3/2017 | Liess |
| 2017/0204846 A1 | 7/2017 | Robison et al. |
| 2017/0211327 A1 | 7/2017 | Wern et al. |
| 2017/0211343 A1 | 7/2017 | Thiemann |
| 2017/0284164 A1 | 10/2017 | Holmes et al. |

FOREIGN PATENT DOCUMENTS

| | | |
|---|---|---|
| AU | 2014215938 A1 | 9/2014 |
| AU | 2015234310 A1 | 10/2015 |
| CA | 2 707 050 A1 | 6/2009 |
| CA | 2707050 A1 | 6/2009 |
| CA | 2 841 654 A1 | 8/2015 |
| CA | 2841654 A1 | 8/2015 |
| CA | 2 944 327 A1 | 10/2015 |
| CN | 2412105 Y | 12/2000 |
| CN | 201810278 U | 4/2011 |
| DE | 102007016822 A1 | 10/2008 |
| EP | 0 250 072 A2 | 12/1987 |
| EP | 0 250 072 B1 | 4/1991 |
| EP | 1 619 349 A2 | 1/2006 |
| EP | 1619349 A2 | 1/2006 |
| EP | 1 772 715 A2 | 4/2007 |
| EP | 1772715 A2 | 4/2007 |
| EP | 1 961 912 A1 | 8/2008 |
| EP | 1 961 913 A1 | 8/2008 |
| EP | 1961912 A1 | 8/2008 |
| EP | 1961913 A1 | 8/2008 |
| EP | 2085566 A2 | 8/2009 |
| EP | 2 322 357 A1 | 5/2011 |
| EP | 2808483 A2 | 12/2014 |
| EP | 3032025 A1 | 6/2016 |
| GB | 1487948 A | 10/1977 |
| GB | 2 077 812 A | 12/1981 |
| GB | 2077812 A | 12/1981 |
| GB | 2 180 027 A | 3/1987 |
| GB | 2180027 A | 3/1987 |
| GB | 2 228 025 A | 8/1990 |
| GB | 2228025 A | 8/1990 |
| GB | 2 314 391 A | 12/1997 |
| GB | 2314391 A | 12/1997 |
| WO | 02068788 A2 | 9/2002 |
| WO | 2004/079153 A2 | 9/2004 |
| WO | 2004079153 A2 | 9/2004 |
| WO | 2004/101417 A2 | 11/2004 |
| WO | 2004101417 A2 | 11/2004 |
| WO | 2007/001887 A2 | 1/2007 |
| WO | 2007001887 A2 | 1/2007 |
| WO | 2007/070805 A2 | 6/2007 |

(56) References Cited

FOREIGN PATENT DOCUMENTS

| | | | |
|---|---|---|---|
| WO | 2007127737 A2 | 11/2007 |
| WO | 2008005767 A1 | 1/2008 |
| WO | 2009/76648 A2 | 6/2009 |
| WO | 2009/076648 A2 | 6/2009 |
| WO | 2009076648 A2 | 6/2009 |
| WO | 2010057221 A2 | 5/2010 |
| WO | 2012021555 A2 | 2/2012 |
| WO | 2012100019 A1 | 7/2012 |
| WO | 2012115717 A2 | 8/2012 |
| WO | 2014056092 A1 | 4/2014 |
| WO | 2014/182272 A1 | 11/2014 |
| WO | 2015/000023 A1 | 1/2015 |
| WO | 2015000023 A1 | 1/2015 |
| WO | 2015/119509 A1 | 8/2015 |
| WO | 2015/127433 A1 | 8/2015 |
| WO | 2015119509 A1 | 8/2015 |
| WO | 2015127433 A1 | 8/2015 |
| WO | 2015176121 A1 | 11/2015 |
| WO | 2016197255 A1 | 12/2016 |
| WO | 2017/044384 A1 | 3/2017 |
| WO | 2017040508 A1 | 3/2017 |
| WO | 2016197255 A9 | 12/2017 |

OTHER PUBLICATIONS

Australian Examination Report dated May 15, 2013, Australian Patent Applicatin No. 2012201644.
PCT Search Report for International Application No. PCT/US2008/086699 dated Nov. 9, 2009.
Australian Examination Report for Application No. 2008334992 dated Apr. 5, 2011.
EP Office Action for Application No. 08860261.0-2315 dated Apr. 12, 2011.
EP Search Report for Application No. 12153779.9-2315 dated Apr. 5, 2012.
PCT Search Report for International Application No. PCT/US2008/086699 dated Sep. 9, 2009.
Canadian Office Action dated Aug. 24, 2015, for corresponding Application No. 2,837,581.
EPO Extended European Search Report dated Nov. 23, 2015, for EPO Patent Application No. 15166062.8.
Australian Patent Examination Report dated Feb. 4, 2016, for Australian Patent Application No. 2014215938.
Canadian Office Action dated Apr. 25, 2016, for Canadian Patent Application No. 2,837,581.
PCT International Search Report and Written Opinion dated Jul. 25, 2016, for International Patent Application No. PCT/US2015/061960.
EPO Extended European Search Report dated Dec. 4, 2017, for European Application No. 17195552.9.
PCT International Search Report and Written Opinion dated Feb. 20, 2017 for International Application No. PCT/US2016/050139.
PCT International Search Report and Written Opinion dated Nov. 11, 2016, for International Application No. PCT/US2016/046445.
"Fundamentals of Hydraulic Motors," Staff Report, Hydraulics and Pneumatics, Jun. 26, 2014, http://hydraulicspneumatics.com/hydraulic-pumps-motors/fundamentals-hydraulic-motors, accessed Aug. 12, 2015 (6 total pages).
A123 Systems, 14Ah Prismatic Pouch Cell, Product Specification, www.a123systems.com.
Eaton Low Speed High Torque Motors E-MOLO-MC001-E6 Brochure, Sep. 2011 (16 total pages).
Warrior, 250E Electric Top Drive (250-TON), 250H Hydraulic Top Drive (250-TON), Brochure, Apr. 2014, Rev. 1, www.warriorrig.com.
Warrior, 500E Electric Top Drive (500 ton—1000hp), Brochure, Document No. EC 009, May 2015, Rev. 3, www.warriorrig.com.
Weatherford, TorkSub™ Stand-Alone Torque Measuring System, Product Specification, Document No. 11368.00, Copyright 2011-2014, www.weatherford.com.

PCT International Search Report and Written Opinion dated Nov. 25, 2016, for International Patent Application No. PCT/US2016/050542.
Streicher Load/Torque Cell System Brochure, Streicher Group, 1 Page.
Enchanced Torque & Tension Sub With Integrated Turns Brochure, 3PS, Inc.,, 2 Pages.
PCT International Search Report and Written Opinion dated Jan. 12, 2017, for International Patent Application No. PCT/US2016/047813.
PCT International Search Report and Written Opinion dated Nov. 22, 2016, for International Patent Application No. PCT/US2016/049462.
PCT International Search Report and Written Opinion dated Apr. 4, 2017, for International Application No. PCT/US2017/014646.
Warrior, 250E Electric Top Drive (250-TON), 250H Hydraulic Top Drive (250-TON), Brochure, Apr. 2014, Rev. 1.
Warrior, 500E Electric Top Drive (500 ton—1000hp), Brochure, Document No. EC 009, May 2015, Rev. 3.
Weatherford, TorkSub™ Stand-Alone Torque Measuring System, Product Specification, Document No. 11368.00, www.weatherford.com.
EPO Extended Europeam Search RPT dated Jun. 8, 2017 for European Pat. Application No. 17152458.0.
EPO Extended European Search Report dated Jun. 8, 2017, for European Patent Application No. 17152458.0.
Australian Examination Report dated Sep. 19, 2017, for Australian Patent Application No. 2017200371.
Australian Examination Report dated Feb. 8, 2018 for Australian Patent Application No. 2017200371.
PCT International Search Report and Written Opinion dated Jun. 8, 2017, for Internaitonal Application No. PCT/US2017/014224.
Lefevre,Bruno et al., "Deeper, more deviated wells push development of smart drill stem rotary shouldered connections," Drilling Technology, (2008), pp. 130-132.
Rotary Sholder Handbook, 2010 National Oilwell Varco, D392002466-MKT-001 Rev.02,116 pages.
Weatherford; Rotaflex Long-Stroke Pumping Units; Artificial Lift Systems; date unknown; 17 total pages.
Analog Devices; Data Sheet; Precision ±1.7 g, ±5 g, ±18 g Single-/Dual-Axis iMEMSÒ Accelerometer; 2004-2014; 16 total pages.
Dr. Richard Thornton; Elevator World; Linear Synchronous Motors for Elevators; dated Sep. 2006; 2 total pages.
Weatherford; Production Optimization; Stainless Steel Polished-Rod Load Cell dated 2008; 2 total pages.
Wieler, et al.; Elevator World; Linear Synchronous Motor Elevators Become a Reality; dated May 2012; 4 total pages.
MagneMotion; LSM Elevators; White Paper dated 2013; 2 total pages.
Weatherford; Rotaflex Long-Stroke Pumping Units; Proven Technology for Deep, Challenging, and High-Volume Wells; dated 2014; 24 total pages.
U.S. Appl. No. 14/717,441 entitled Dart Detector for Wellbore Tubular Cementation in the name of Zippel, et al; 35 total pages; filed May 20, 2015.
PCT International Search Report and Written Opinion dated Aug. 24, 2016, for International Application No. PCT/US2016/015838.
Bosch Rexroth AG, Electric Drives and Controls, Brochure, "Asynchronous high-speed motors 1MB for high speeds," 6 pages.
Balltec Lifting Solutions, LiftLOK™, Brochure, "Highest integrity lifting tools for the harshest environments," 2 pages.
Balltec Lifting Solutions, CoilLOK™, Brochure, "Highest integrity hand-held coiled tubing handling tools," 2 pages.
A123 System; 14Ah Prismatic Pouch Cell; Nanophosphate® Lithium-Ion; www.a123systems.com; date unknown; 1 page.
Streicher Load/Torque Cell Systems; date unknown; 1 page.
3PS, Inc.; Enhanced Torque and Tension Sub with Integrated Turns; date unknown; 2 total pages.
Lefevre, et al.; Drilling Technology; Deeper, more deviated wells push development of smart drill stem rotary shouldered connections; dated 2008; 2 total pages.
PCT Invitaiton to Pay Additional Fees for International Application No. PCT/US2008/086699; dated Sep. 9, 2009; 7 total pages.

(56) References Cited

OTHER PUBLICATIONS

PCT Notification of Transmittal of the International Search Report and the Written Opinion of the International Searching Authority for International Application No. PCT/US2008/086699; dated Sep. 11, 2009; 19 total pages.
National Oilwell Varco; Rotary Shoulder Handbook; dated 2010; 116 total pages.
Weatherford; TorkSub™ Stand-Alone Torque Measuring System; dated 2011-2014; 4 total pages.
Australian Examination Report for Application No. 2008334992; dated Apr. 5, 2011; 2 total pages.
European Search Report for Application No. 08 860 261.0-2315; dated Apr. 12, 2011; 4 total pages.
Eaton; Spool Valve Hydraulic Motors; dated Sep. 2011; 16 total pages.
European Extended Search Report for Application No. 12153779.9-2315; dated Apr. 5, 2012; 4 total pages.
Australian Examination Report for Application No. 2012201644; dated May 15, 2013; 3 total pages.
Warrior; 250E Electric Top Drive (250-TON); 250H Hydraulic Top Drive (250-TON); dated Apr. 2014; 4 total pages.
Hydraulic Pumps & Motors; Fundamentals of Hydraulic Motors; dated Jun. 26, 2014; 6 total pages.
Warrior; Move Pipe Better; 500E Electric Top Drive (500 ton—1000 hp); dated May 2015; 4 total pages.
Canadian Office Action for Application No. 2,837,581; dated Aug. 24, 2015; 3 total pages.
European Extended Search Report for Application No. 15166062.8-1610; dated Nov. 23, 2015; 6 total pages.
Australian Examination Report for Application No. 2014215938; dated Feb. 4, 2016; 3 total pages.
Rexroth; Bosch Group; Motors and Gearboxes; Asynchronous high-speed motors 1 MB for high speeds; dated Apr. 13, 2016; 6 total pages.
Canadian Office Action for Application No. 2,837,581; dated Apr. 25, 2016; 3 total pages.
PCT Notification of Transmittal of the International Search Report and the Written Opinion of the International Searching Authority for International Application No. PCT/US2015/061960; dated Jul. 25, 2016; 16 total pages.
PCT Notification of Transmittal of the International Search Report and the Written Opinion of the International Searching Authority for International Application No. PCT/US2016/049462; dated Nov. 22, 2016; 14 total pages.
PCT Notification of Transmittal of the International Search Report and the Written Opinion of the International Searching Authority for International Application No. PCT/US2016/050542; dated Nov. 25, 2016; 13 total pages.
PCT Notification of Transmittal of the International Search Report and the Written Opinion of the International Searching Authority for International Application No. PCT/US2016/047813; dated Jan. 12, 2017; 15 total pages.
PCT Notification of Transmittal of the International Search Report and the Written Opinion of the International Searching Authority for International Application No. PCT/US2016/050139; dated Feb. 20, 2017; 20 total pages.
PCT Notification of Transmittal of the International Search Report and the Written Opinion of the International Searching Authority for International Application No. PCT/US2017/014646; dated Apr. 4, 2017; 14 total pages.
PCT Notification of Transmittal of the International Search Report and the Written Opinion of the International Searching Authority for International Application No. PCT/US2017/014224; dated Jun. 8, 2017; 15 total pages.
European Extended Search Report for Application No. 17152458.0-1609; dated Jun. 8, 2017; 7 total pages.
Australian Examination Report for Application No. 2017200371; dated Sep. 19, 2017; 5 total pages.
European Extended Search Report for Application No. 17195552.9-1614; dated Dec. 4, 2017; 6 total pages.
Australian Examination Report for Application No. 2017200371; dated Feb. 8, 2018; 6 total pages.
Canadian Office Action for Application No. 2,955,754; dated Mar. 28, 2018; 3 total pages.
Australian Examination Report for Application No. 2017200371; dated May 2, 2018; 4 total pages.
Canadian Office Action for Application No. 2,974,298; dated May 16, 2018; 3 total pages.
European Patent Office; Extended European Search Report for Application No. 18157915.2; dated Jun. 6, 2018; 8 total pages.
Canadian Office Action in related application CA 2,955,754 dated Jul. 17, 2018.
EPO Extended European Search Report dated Jul. 19, 2018, for European Application No. 18159595.0.
EPO Extended European Search Report dated Jul. 17, 2018, for European Application No. 18158050.7.
Cookson, Colter, "Inventions Speed Drilling, Cut Costs," The American Oil & Gas Reporter, Sep. 2015, 2 pages.
Ennaifer, Amine et al. , "Step Change in Well Testing Operations," Oilfield Review, Autumn 2014: 26, No. 3, pp. 32-41.
Peters; Tool Coupler for Use With a Top Drive; U.S. Appl. No. 15/656,508, filed Jul. 21, 2017. (Application not attached to IDS.).
Fuehring et al.; Tool Coupler With Rotating Coupling Method for Top Drive; U.S. Appl. No. 15/445,758, filed Feb. 28, 2017. (Application not attached to IDS.).
Bell; Interchangeable Swivel Combined Multicoupler; U.S. Appl. No. 15/607,159, filed May 26, 2017 (Application not attached to IDS.).
Amezaga; Dual Torque Transfer for Top Drive System; U.S. Appl. No. 15/447,881, filed Mar. 2, 2017. (Application not attached to IDS.).
Zouhair; Coupler With Threaded Connection for Pipe Handler; U.S. Appl. No. 15/444,016, filed Feb. 27, 2017. (Application not attached to IDS.).
Liess; Downhole Tool Coupling System; U.S. Appl. 15/670,897, filed Aug. 7, 2017. (Application not attached to IDS.).
Muller et al; Combined Multi-Coupler With Rotating Locking Method for Top Drive; U.S. Appl. No. 15/721,216, filed Sep. 29, 2017. (Application not attached to IDS.).
Amezaga et al; Tool Coupler With Threaded Connection for Top Drive; U.S. Appl. No. 15/457,572, filed Mar. 13, 2017. (Application not attached to IDS.).
Wiens; Combined Multi-Coupler With Locking Clamp Connection for Top Drive; U.S. Appl. No. 15/627,428, filed Jun. 19, 2017. (Application not attached to IDS.).
Henke et al.; Tool Coupler With Sliding Coupling Members for Top Drive; U.S. Appl. No. 15/448,297, filed Mar. 2, 2017. (Application not attached to IDS.).
Schoknecht et al.; Combined Multi-Coupler With Rotating Fixations for Top Drive; U.S. Appl. No. 15/447,926, filed Mar. 2, 2017. (Application not attached to IDS.).
Metzlaff et al.; Combined Multi-Coupler for Top Drive; U.S. Appl. No. 15/627,237, filed Jun. 19, 2017. (Application not attached to IDS.).
Liess; Combined Multi-Coupler for Top Drive; U.S. Appl. No. 15/656,914, filed Jul. 21, 2017. (Application not attached to IDS.).
Liess et al.; Combined Multi-Coupler; U.S. Appl. No. 15/656,684, filed Jul. 21, 2017. (Application not attached to IDS).
Amezaga et al.; Tool Coupler With Data and Signal Transfer Methods for Top Drive; U.S. Appl. No. 15/730,305, filed Oct. 11, 2017. (Application not attached to IDS).
Liess; Tool Coupler With Threaded Connection for Top Drive; U.S. Appl. 15/806,560, filed Nov. 8, 2017. (Application not attached to IDS).
European Examination Report in related application EP 16754089.7 dated Jun. 24, 2019.
European Partial Search Report in related application EP 16754089.7 dated Dec. 20, 2018.
International Preliminary Report on Patentability in related application PCT/US2016/046458 dated Feb. 13, 2018.
EPO Partial European Search Report dated Jul. 31, 2018, for European Application No. 18159597.6.

(56) References Cited

OTHER PUBLICATIONS

European Patent Office; Extended Search Report for Application No. 18160808.4; dated Sep. 20, 2018; 8 total pages.
EPO Partial European Search Report dated Oct. 4, 2018, for European Patent Application No. 18159598.4.
EPO Extended European Search Report dated Oct. 5, 2018, for European Patent Application No. 18173275.1.
EPO Extended European Search Report dated Nov. 6, 2018, for European Application No. 18159597.6.
International Search Report and Written Opinion in PCT/US2018/042812 dated Oct. 17, 2018.
Extended Search Report in application EP18177312.8 dated Nov. 6, 2018.
PCT International Search Report and Written Opinion dated Oct. 23, 2018, for International Application No. PCT/US2018/044162.
EPO Extended European Search Report dated Nov. 15, 2018, for European Application No. 18177311.0.
PCT International Search Report and Written Opinion dated Dec. 19, 2018, for International Application No. PCT/US2018/042813.
PCT International Search Report and Written Opinion dated Jan. 3, 2019, for International Application No. PCT/US2018/0429021.
EPO Extended European Search Report dated Feb. 18, 2019, for European Application No. 18159598.4.
Office Action in related application EP 18177311.0 dated Mar. 3, 2019.
EPO Result of Consultation dated Mar. 13, 2019, European Application No. 18177311.0.
European Office Action dated Apr. 1, 2019 for Application No. 18173275.1.
European Office Action in related application EP 16760375.2 dated Mar. 25, 2019.
International Preliminary Report on Patentability in related application PCT/US2016/046458 dated Feb. 22, 2018.
European Patent Office; Partial Search Report for Application No. 16 754 089.7 dated Dec. 4, 2018; 7 total pages.

* cited by examiner

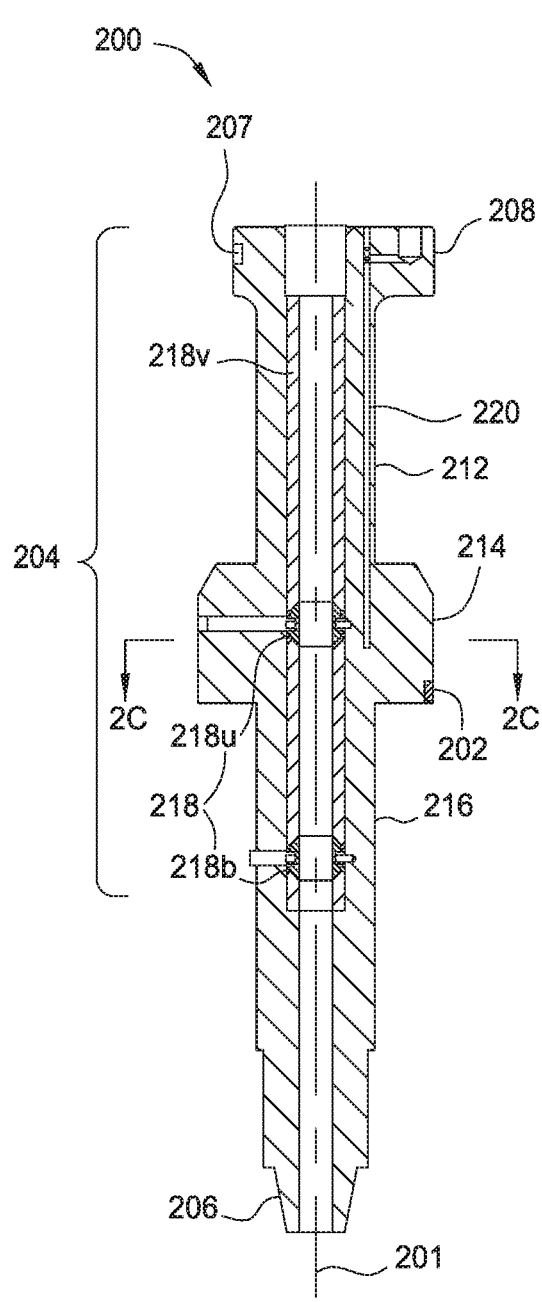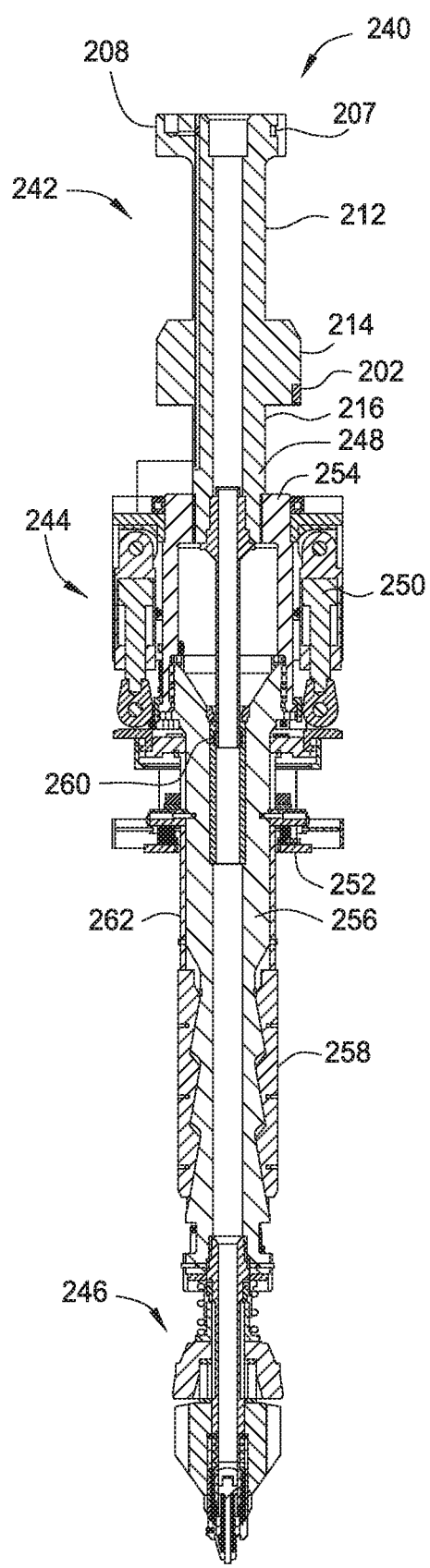
FIG. 2A
FIG. 2D

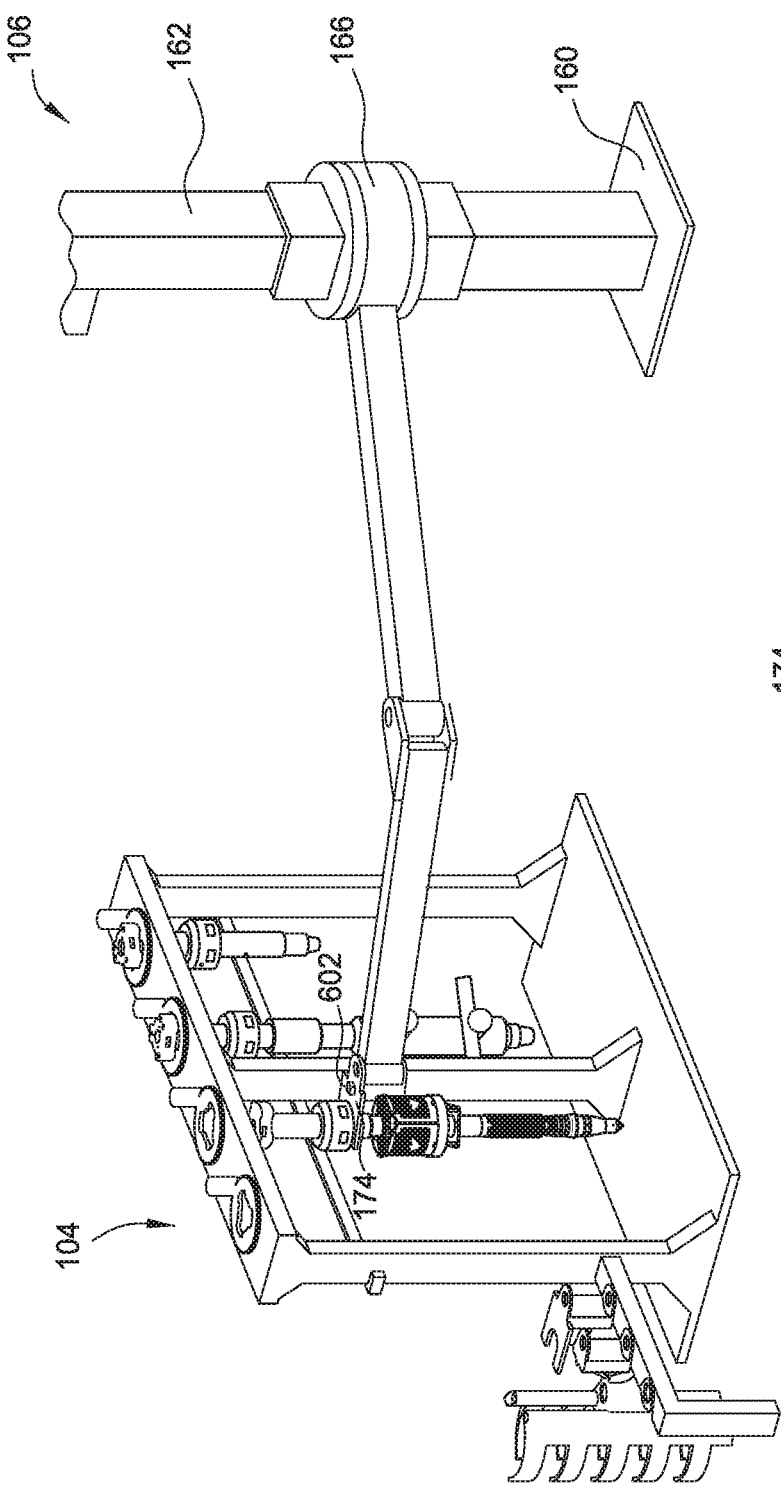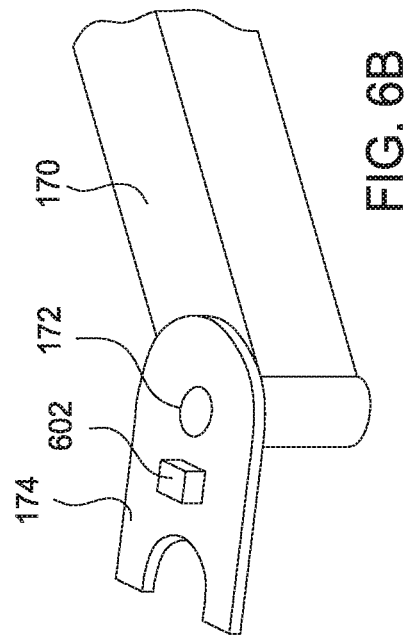
FIG. 6A
FIG. 6B

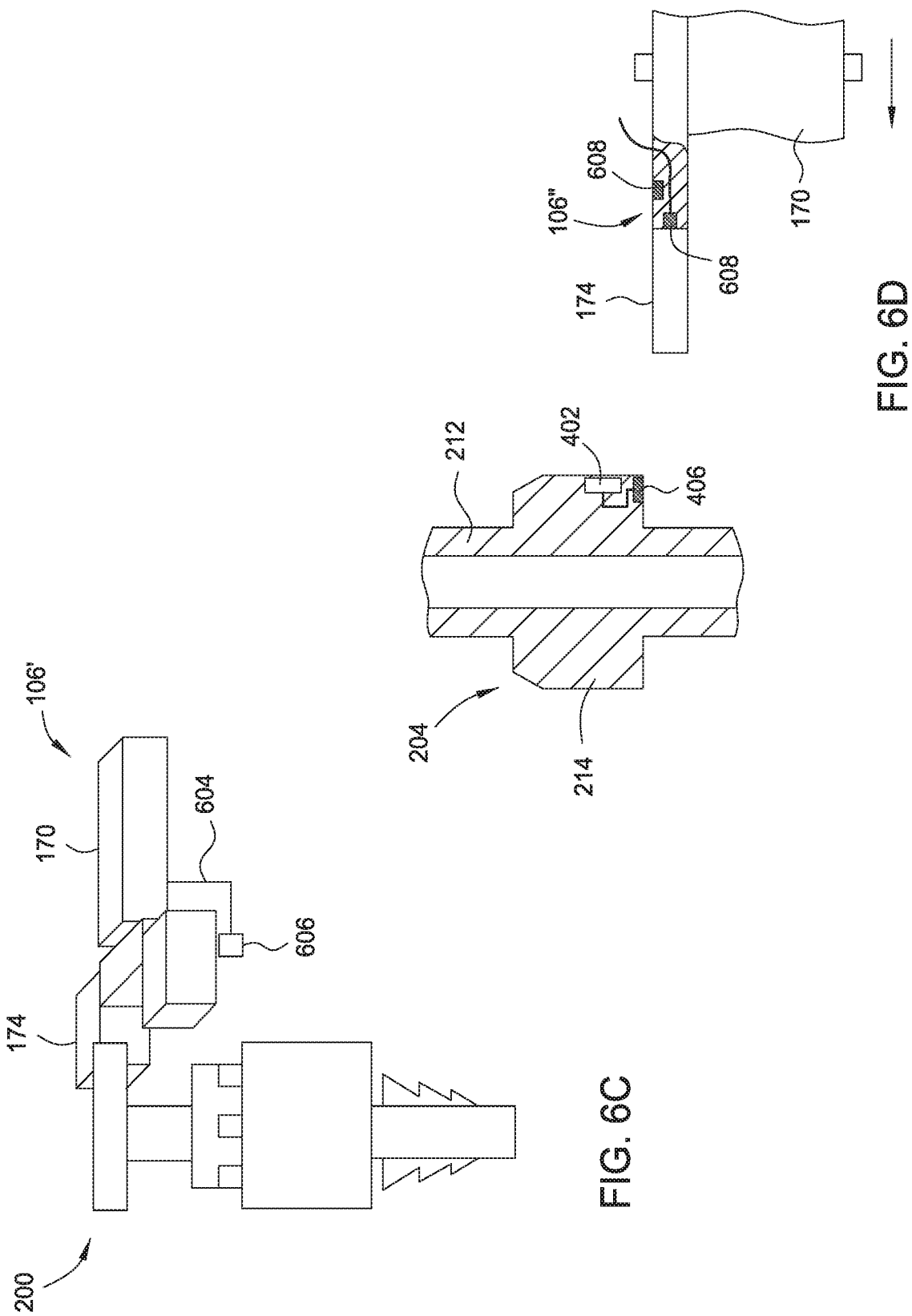

TOOL IDENTIFICATION

CLAIM OF PRIORITY UNDER 35 U.S.C. 119

This application claims benefit of U.S. Provisional Patent Application No. 62/203,712, filed Aug. 11, 2015, and entitled "Resistance Welding Method for Sucker Rod" which is herein incorporated by reference in its entirety.

BACKGROUND OF THE DISCLOSURE

Field of the Disclosure

The present disclosure generally relates to apparatus and methods for tool identification during a well operation. More particularly, the present disclosure relates to apparatus and method for automatic tool identification in a modular top drive system.

Description of the Related Art

During a well operation, various tools are used with a top drive. First, a wellbore is formed to access hydrocarbon-bearing formations (e.g., crude oil and/or natural gas) or for geothermal power generation by drilling. Drilling is accomplished by utilizing a drill bit that is mounted on the end of a drill string. To drill within the wellbore to a predetermined depth, the drill string is connected to a top drive on a surface rig by a drilling tool and rotated by the top drive. After drilling to a predetermined depth, the drilling tool, drill string and drill bit are removed from the top drive. A casing tool is then attached to the top drive to lower a section of casing into the wellbore. An annulus is thus formed between the casing string and the formation. The casing string may then be hung from the wellhead. The casing tool may then be replaced by a cementing tool to conduct a cementing operation to fill the annulus with cement. The casing string is cemented into the wellbore by circulating cement into the annulus defined between the outer wall of the casing and the borehole. The combination of cement and casing strengthens the wellbore and facilitates the isolation of certain areas of the formation behind the casing for the production of hydrocarbons. The tool exchange during drilling, casing, and cementing modes usually requires personnel to identify the correct tool and to work at heights on the rig thus is time consuming and dangerous.

Therefore, there is a need for apparatus and methods for automatic tool identification to enable automated tool exchange during a well operation.

SUMMARY OF THE DISCLOSURE

The present disclosure generally relates to apparatus and methods for automatic tool identification in a modular top drive system. The modular top drive system may include an identification reader for automatically identifying tools during operation for rig up and tool exchange. The identification reader may be disposed in one of a tool storage unit, a tool change unit or a top drive unit. Drilling tools, cementing tools and casing tools with one or more identification devices may be used with the modular top drive system. The one or more identification devices may be radio frequency identification devices, barcodes, such as linear barcodes and matrix barcodes, text tags, micro-controllers, or combinations thereof.

One embodiment of the present disclosure provides a method for operating a modular top drive system. The method includes positioning a tool within a range of an identification reader, reading one or more identification devices on the tool using the identification reader to identify the tool, configuring a top drive unit according to the identification of the tool, and engaging the tool to a top drive unit.

Another embodiment provides a modular top drive system including a top drive unit for selectively connecting to a tool, an identification reader configured to obtain identity information from identification devices, and a central control unit connectable to the top drive unit and the identification reader.

One embodiment provides a modular top drive system. The modular top drive system comprises a top drive unit for selectively connecting to a tool by a friction structure, such as slips, or by a weight bearing shoulder, such as a shoulder having a latch profile, and an identification reader, wherein the identification reader is configured to obtain identity information from identification devices on tools.

Another embodiment provides a method for operating a modular top drive system. The method includes positioning a tool within a range of an identification reader, reading one or more identification devices on the tool using the tool identification reader to confirm the tool is the correct tool; and engaging the tool to a top drive unit.

Another embodiment provides a tool for construction of a wellbore. The tool includes a coupling for connecting to a top drive by a friction structure, or a weight bearing shoulder, and one or more identification devices including identification information.

Another embodiment provides a top drive unit for construction of a wellbore. The top drive unit includes a drive body, a drive motor having a stator connected to the drive body, a coupler torsionally connected to a rotor of the drive motor for selectively connecting a tool, and an identification reader to obtain identity information of an identification device on the tool.

Another embodiment provides a tool change unit. The tool change unit includes a tool holder configured to lift a tool, a drive assembly configured to move the tool holder, and an identification reader to obtain identity information from an identification device on the tool.

Another embodiment provides a tool storage unit. The tool storage unit includes a frame having one or more parking spots, and an identification reader to obtain identity information from identification devices on tools in the parking spots. Each parking spot is configured to receive one of a drilling tool, a casing tool, a cementing tool, a fracturing tool, a pump, a sand screen, a clamping tool, an internal gripping tool, an external gripping tool, an adaptor, or a combination thereof.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2A is schematic sectional view of a drilling tool including an identification device according to one embodiment of the present disclosure.

FIG. 2D is schematic sectional view of a casing tool including an identification device according to one embodiment of the present disclosure.

FIG. 6A is a schematic perspective view of a tool change unit capable of identifying tools according to one embodiment of the present disclosure.

FIG. 6B is a partial enlarged view of the tool change unit of FIG. 6A.

FIG. 6C is a partial perspective view of a tool change unit capable of identifying tools according to one embodiment of the present disclosure.

FIG. 6D is a partial sectional view of a tool change unit according to another embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
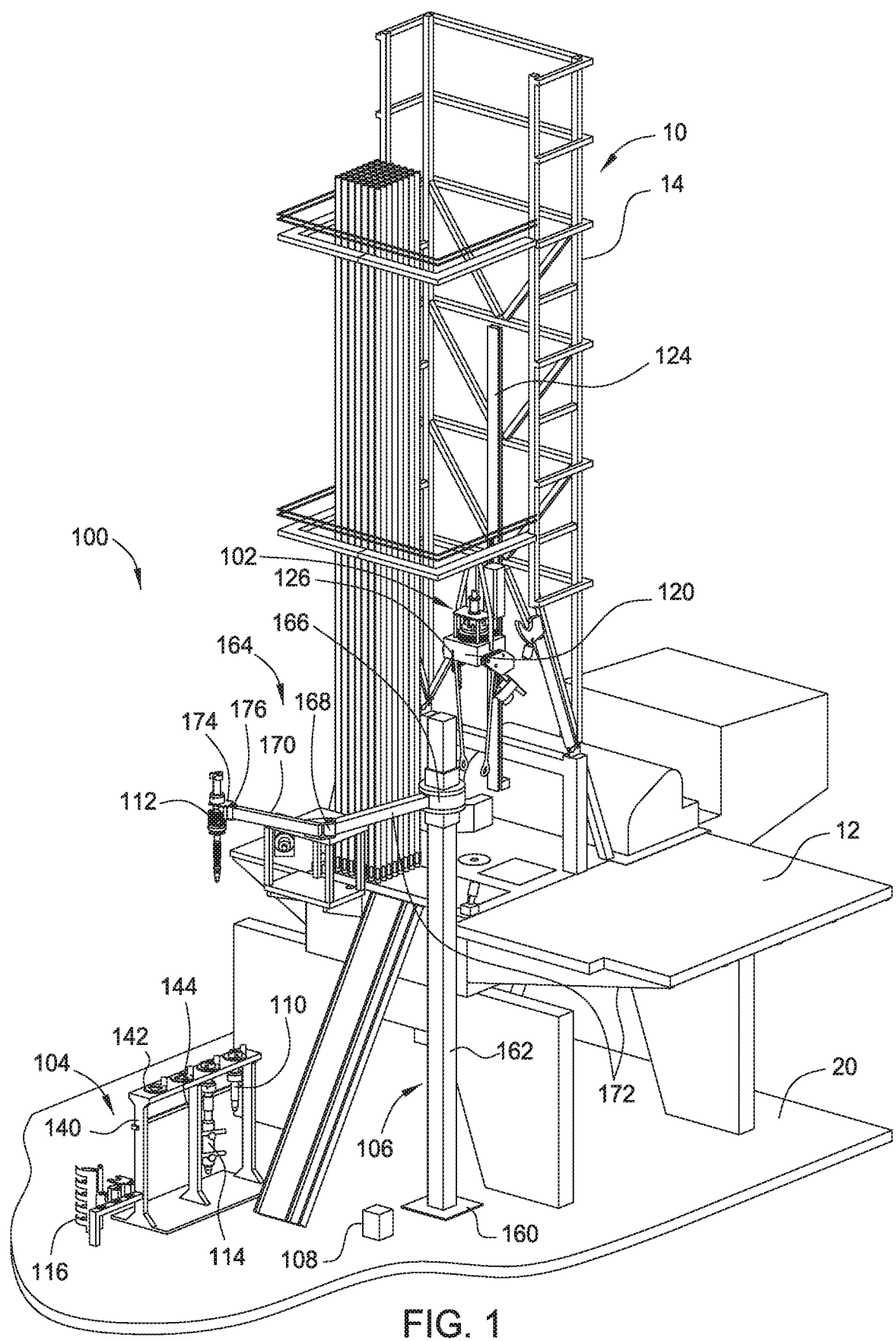
FIG. 1 schematically illustrates a modular top drive system according to one embodiment of the present disclosure.

FIG. 1 schematically illustrates a modular top drive system 100 according to one embodiment of the present disclosure. The modular top drive system 100 may include a top drive unit 102, a tool storage unit 104, and a tool change unit 106. In one embodiment, the modular top drive system 100 may further include a central control unit 108 connected to at least one of the top drive unit 102, the tool storage unit 104, or the tool change unit 106. In one embodiment, the central control unit 108 is connected to all of the top drive unit 102, the tool storage unit 104, and the tool change unit 106.

The modular top drive system 100 may be used in on a drilling rig 10 for a well operation. The top drive unit 102 may be mounted on a derrick 14 on a rig floor 12. A plurality of tools may be exchangeably attached to the top drive unit 102 to perform various operations. For example, a drilling tool 110 may be attached to the top drive unit 102 for drilling, a casing tool 112 may be attached to the top drive unit 102 for installing casing to the wellbore, a cementing tool 114 may be attached to the top drive unit 102 to perform cementing, and accessories 116 may be used to perform other operations. The tool storage unit 104 and the tool change unit 106 may be disposed on a deck 20. A plurality of tools, such as the drilling tool 110, the casing tool 112, the cementing tool 114, and the accessories 116, may be stored in the tool storage unit 104 when not in use. The tool change unit 106 is configured to transfer the plurality of tools between the tool storage unit 104 and the top drive unit 102. The plurality of tools may include a universal coupling so that each of the plurality of tools can be interchangeably connected to the top drive unit 102, stored in the tool storage unit 104, and handled by the tool change unit 106.

Even though the drilling tool 110, the casing tool 112, the cementing tool 114, and the accessories 116 are illustrated in FIG. 1, the plurality of tools may include any suitable tools, such as completion tools, fracturing tools, pumps, sand screens, clamping tools, internal gripping tools, external gripping tools, adaptors, or combinations thereof.

In one embodiment, one or more of the plurality of tools may include an identification device that may be used to store identify information of the tool. In one embodiment, the identification device may also be used to store additional information, such as operational parameters and/or operation history of the tool.

In one embodiment, at least one of the tool storage unit 104, the top drive unit 102, and the tool change unit 106 includes a reading device configured to interact with the tool identification device and retrieve information to identify the tool.

In one embodiment, identification of the tools may be transmitted to the central control unit 108 by the top drive unit 102, the tool storage unit 104 or the tool change unit 106. The central control unit 108 may use the identification of the tools to control the operation, for example to control an automatic tool exchange process.

The top drive unit 102 may include a coupling unit 120 configured to selectively connect and operate one or more tools, such as the drilling tool 110, the casing tool 112, the cementing tool 114. The top drive unit 102 may include a trolley (not shown) configured to couple the coupling unit 120 to a rail 124 on the derrick 14. In one embodiment, the top drive unit 102 may include a tool identifying device 126. The tool identifying device 126 may be configured to interact with the identification device in each tool connected to the top drive unit 102 or each tool to be connected to the top drive unit 102.

The tool storage unit 104 may include a frame 140 and a plurality of tool receiving slots 142. Each of the tool receiving slots 142 may be configured to receive a tool. In one embodiment, each tool receiving slots 142 may include a coupling profile for receiving a tool. The coupling profile in each tool receiving slot 142 may be the same as the coupling profile in the top drive unit 102. In one embodiment, the tool storage unit 104 may further include a tool identifying device 144 configured to identify tools disposed in the tool storage unit 104.

The tool change unit 106 may include a base 160. The base 160 may be secured to the deck 20 of the drilling rig 10 or adjacent structures. A post 162 may extend from the base 160. The post 162 may extend vertically from the base 160 to a height above the rig floor 12 such that the tool change unit 106 may retrieve any of the tools from the tool storage unit 104 and deliver the retrieved tools to the top drive unit 102 and vice versa.

The tool change unit 106 further includes a slide hinge 166 connected to the post 162, and an arm 164 connected to the slide hinge 166. The slide hinge 166 may be connected to the post 162 by a linear actuator that moves the slide hinge 166 longitudinally along the post 162. The slide hinge 166 may also be pivotally connected to the linear actuator allowing pivoting of the arm 164 relative to the post 162. The linear actuator may include an electric slew motor, a hydraulic slew motor, or an electro-mechanical linear actuator.

The arm 164 may include an aft-arm 172, a forearm 170, and an actuated joint 168 connecting the forearm 170 and the aft-arm 172. A tool holder 174 may be releasably connected to the forearm 170. The arm 164 may further include an arm actuator (not shown) for selectively curling and extending the forearm 170 and relative to the aft-arm 172. The arm actuator may include a cylinder and a piston disposed in a bore of the cylinder. Alternatively, the arm actuator may include an electro-mechanical linear actuator, such as a motor and lead screw or pinion and gear rod, instead of the piston and cylinder assembly. Alternatively, the actuated joint may be a telescopic joint instead of an elbow.

In one embodiment, the tool change unit 106 may include a tool identifying device 176. The tool identifying device 176 may be disposed near the tool holder 174 to identify tools engaged by the tool holder 174 or adjacent the tool holder 174.

In one embodiment, the modular top drive system 100 may include a traditional tool handling equipment, such as a crane, a stabmaster lift, a telescoping lift, or the likes, in place of the tool change unit 106 to transfer the plurality of tools between the tool storage unit 104 and the top drive unit 102.

In one embodiment, the modular top drive system 100 is not equipped with the tool storage unit 104. One or more tools may be stored in convenient locations on the rig.

In one embodiment, the modular top drive system 100 is not equipment with the tool storage unit 104 and the tool change unit 106. A tool to be installed on the top drive unit 102 may be transported to the deck using traditional equipment, such as a manually controlled crane, a stabmaster lift, a telescoping tool, and secured to the slips on the deck. The top drive unit 102 may then move down towards the slips to connect with the tool on the slips. To detach a tool from the top drive unit 102, the top drive unit 102 may move down towards the slips on the deck to set the tool on the slips and release the tool.

In one embodiment, the modular top drive system 100 may be configured to read identification devices of a plurality of tools consistently or periodically so that identifications and/or locations of the plurality of tools are available all the time to different units. For example, identification, location, and/or other information of the plurality of tools may be stored in a database in the central control unit 108. The database may be updated when the identification devices on the plurality of tools are read by various readers. In one embodiment, the identification devices on a tool is read each time the tool enters into the range of one of the reader, such as the readers in the tool storage unit 104, by the readers in the tool change unit 106, or by the readers in the top drive unit 102. The location of the tool may be determined by location of the reader that makes the latest reading of the tool.

FIG. 2A is schematic sectional view of a drilling tool 200 having an identification device 202. The drilling tool 200 may be used in place of the drilling tool 110 in the modular top drive system 100. The drilling tool 200 may include a coupling 204 and a quill 206 extended from the coupling 204.

Figure 2B:
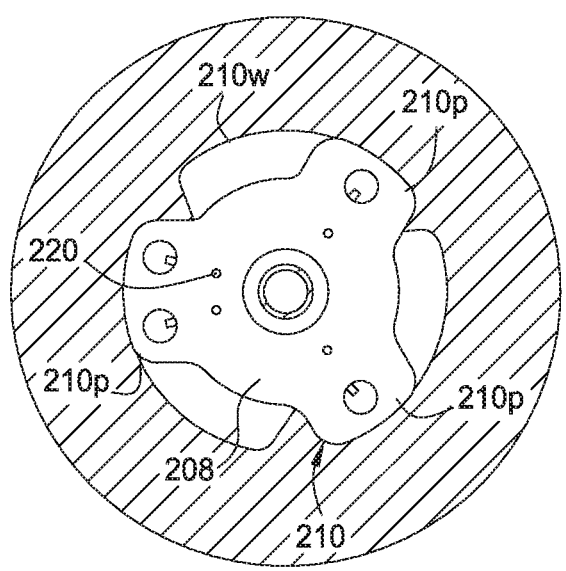
FIG. 2B is a schematic top view of an external profile of a coupling of the drilling tool of FIG. 2A.

The coupling 204 may include a head 208 having an external profile 210 for latching with the top drive unit 102, the tool storage unit 104, or the tool change unit 106. In one embodiment, the external profile 210 is a bayonet profile as shown in FIG. 2B. The bayonet profile may have one or more external prongs 210p and prong-ways 210w spaced around the head 208 at regular intervals. The top drive unit 102 may include a mating bayonet profile having one or more internal prongs and prong-ways spaced at regular intervals. When the external prongs 210p of the head 208 align with internal prongs of the top drive unit 102, the head 208 may be engaged with the internal prongs of the top drive unit 102. When the external prongs 210p of the head 208 are aligned with the internal prong-ways of the top drive unit 102, the head 208 may be free to pass through the top drive unit 102.

Alternatively, the coupling 204 may be designed to connect with a top drive unit by other suitable mechanism, such as by a friction structure, such as slips, by a load bearing head, or by a threaded connection.

The head 208 may also have one or more locking slots 207. The locking slots 207 may receive locking pins from a drive unit, such as the top drive unit 102, during operation so that the drilling tool 200 may be secured attached to the drive unit to receive torque from the drive unit. The locking slots 207 may be formed in suitable locations and/or arranged in a pattern to match with a coupler in a drive unit.

The coupling 204 further include a neck 212 extending from the head 208. The neck 212 has a reduced diameter relative to a maximum outer diameter of the head 208 to allow the coupling 204 to extend through the length of the internal bayonet in the top drive unit 102. The coupling 204 may further include a lifting shoulder 214 connected to a lower end of the neck 212. The lifting shoulder 214 has an enlarged diameter relative to the reduced diameter of the neck 212. A torso 216 having a reduced diameter relative to the lifting shoulder 214 may extend from the lifting shoulder 214. The torso 216 may have a length corresponding to a length of the tool holder 174 of the tool change unit 106 so that a bottom of the lifting shoulder 214 may seat on a top of the tool holder 174 for transport between the tool storage unit 104 to the top drive unit 102.

The quill 206 may be a shaft having an upper end connected to the torso 216. The quill 206 may have a bore formed therethrough and a threaded coupling, such as a pin, formed at a lower end thereof. In one embodiment, the drilling tool 200 may further include an internal blowout preventer (IBOP) 218. The IBOP 218 may include an internal sleeve 218v and one or more shutoff valves 218u and 218b. Each shutoff valve 218u, 218b may be actuated.

In one embodiment, the drilling tool 200 may have one or more hydraulic passages 220 formed therein. The hydraulic passage 220 may be used to provide fluid communication between HPU manifold and hydraulic devices, such as hydraulic swivel or control lines.

The identification device 202 may be attached to an outer surface of the drilling tool 200, for example by adhesives. Alternatively, the identification device 202 may be disposed in a recessed space for secure attachment. Alternatively, the identification device 202 may be embedded inside the drilling tool 200 when the identification device 202 does not require direct line of sight to interact with a corresponding identification reader.

The identification device 202 may be disposed on the lifting shoulder 214 of the drilling tool 200 in FIG. 2A. Alternatively, the identification device 202 may be disposed in any suitable locations on the drilling tool 200. For example, the identification device 202 may be disposed on the coupling 204.

The identification device 202 may be a radio frequency identification device (RFID), such as a RFID tag or a RFID chip. In one embodiment, the RFID includes preloaded information and data for automatic identification. Preloaded information and data in the RFID may be read by a RFID reader nearby. The RFID may be read by a RFID reader without requiring a direct line of sight.

In one embodiment, the identification device 202 may be a standard RFID tag with an Electronic Product Code (EPC) printed thereon by a RFID printer. An EPC code includes a product serial number which may be used to retrieve detailed information from a database, such as a database in the central control unit 108 of the modular top drive system 100. In another embodiment, the identification device 202 may be a custom made RFID chip which includes custom data set used by a special identification process. The RFID chip may be read-only or re-writable. For example, the RFID chip may include operating history in addition to product information.

In one embodiment, the identification device 202 may be a passive RFID that does not include or is not connected to an electrical power source. The passive RFID may collect energy from interrogating radio waves from a reader nearby and act as a passive transponder to send preloaded information and data to the reader. The identification device 202 of FIG. 2A is a passive device without a power source. Passive identification devices are easy to maintain and may be read anywhere. Alternatively, the identification device 202 may include a power source, such as a battery or a connection to an external power source.

In one embodiment, the drilling tool 200 may include two or more identification devices 202 positioned at various locations. Two or more identification devices 202 may be used to prevent blind spots in an identification reader so that the drilling tool 200 can be identified at any relative positions between the reader and the drilling tool 200. The two or more identification devices 202 may be disposed at different areas of the drilling tool 200. For example, one or more identification devices 202 may be disposed on the lifting shoulder 214 and one or more identification devices may be disposed on the coupling 204.

Figure 2C:
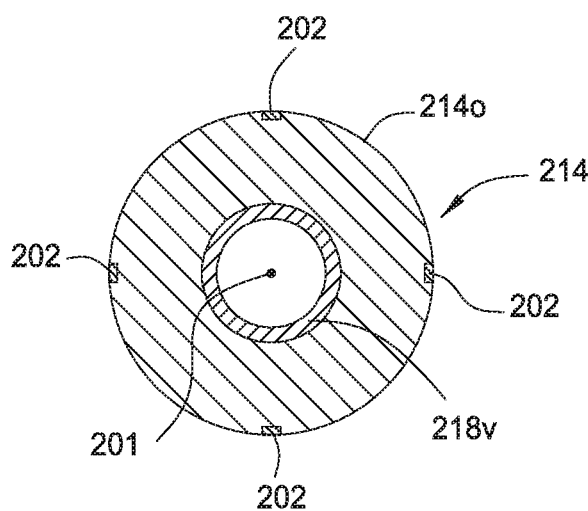
FIG. 2C is a schematic sectional view of the drilling tool of FIG. 2A showing distribution of identification devices.

FIG. 2C is a schematic sectional view of the drilling tool 200 showing distribution of multiple identification devices 202. In the embodiment of FIG. 2C, the drilling tool 200 includes four identification devices 202 distributed along an outer surface 214o of the lifting shoulder 214. In one embodiment, the four identification devices 202 may be positioned at 90 degrees apart from each other. This arrangement of identification devices 202 ensures that at least one of the identification devices 202 is within a range of a reader regardless of the orientation of the drilling tool 200 relative to a central axis 201.

FIG. 2D is schematic sectional view of a casing tool 240 according to one embodiment of the present disclosure. The casing tool 240 may be used in place of the casing tool 112 in the modular top drive system 100. The casing tool 240 includes a coupling 242, a spear 244, and a fill up tool 246. The coupling 242 is similar to the coupling 204 of the drilling tool 200. The coupling 242 allows the casing tool 240 to selectively attach to the top drive unit 102, store in the tool storage unit 104, and to be handled by the tool change unit 106. The coupling 242 includes one or more identification devices 202 so that the casing tool 240 can be identified by the top drive unit 102, the tool storage unit 104, and/or the tool change unit 106.

In one embodiment, the coupling 242 includes an adapter 248 extending from the torso 216 for connection with the spear 244. The adapter 248 may have a bore formed therethrough. In one embodiment, the adapter 248 may include an outer thread and an inner receptacle formed at a lower end thereof.

The spear 244 may include a linear actuator 250, a bumper 252, a collar 254, a mandrel 256, a set of grippers, such as slips 258, a seal joint 260, and a sleeve 262. The collar 254 may have an inner thread formed at each longitudinal end thereof. The collar upper thread may be engaged with the outer thread of the adapter 248, thereby connecting the coupling 242 and the spear 244. The collar lower thread may be engaged with an outer thread formed at an upper end of the mandrel 256 and the mandrel may have an outer flange formed adjacent to the upper thread and engaged with a bottom of the collar 254, thereby connecting the mandrel 256 and the collar 254.

The seal joint 260 may include the inner barrel, an outer barrel, and a nut. The inner barrel may have an outer thread engaged with a threaded portion of the shaft receptacle and an outer portion carrying a seal engaged with a seal bore portion of the shaft receptacle. The mandrel 256 may have a bore formed therethrough and an inner receptacle formed at an upper portion thereof and in communication with the bore. The mandrel receptacle may have an upper conical portion, a threaded mid portion, and a recessed lower portion. The outer barrel may be disposed in the recessed portion of the mandrel 256 and trapped therein by engagement of an outer thread of the nut with the threaded mid portion of the mandrel receptacle. The outer barrel may have a seal bore formed therethrough and a lower portion of the inner barrel may be disposed therein and carry a stab seal engaged therewith.

The linear actuator 250 may include a housing, an upper flange, a plurality of piston and cylinder assemblies, and a lower flange. The housing may be cylindrical, may enclose the cylinders of the assemblies, and may be connected to the upper flange, such as by fastening. The collar 254 may also have an outer thread formed at the upper end thereof. The upper flange may have an inner thread engaged with the outer collar thread, thereby connecting the two members. Each flange may have a pair of lugs for each piston and cylinder assembly connected, such as by fastening or welding, thereto and extending from opposed surfaces thereof.

Each cylinder of the linear actuator 250 may have a coupling, such as a hinge knuckle, formed at an upper end thereof. The upper hinge knuckle of each cylinder may be received by a respective pair of lugs of the upper flange and pivotally connected thereto, such as by fastening. Each piston of the linear actuator 250 may have a coupling, such as a hinge knuckle, formed at a lower end thereof. Each piston of the linear actuator 250 may be disposed in a bore of the respective cylinder. The piston may divide the cylinder bore into a raising chamber and a lowering chamber and the cylinder may have ports formed through a wall thereof and each port may be in fluid communication with a respective chamber.

The sleeve 262 may have an outer shoulder formed in an upper end thereof trapped between upper and lower retainers. A washer may have an inner shoulder formed in a lower end thereof engaged with a bottom of the lower retainer. The washer may be connected to the lower flange, such as by fastening, thereby longitudinally connecting the sleeve 262 to the linear actuator 250. The sleeve 262 may also have one or more (pair shown) slots formed through a wall thereof at an upper portion thereof. The bumper 252 may be connected to the mandrel, such as by one or more threaded fasteners, each fastener extending through a hole thereof, through a respective slot of the sleeve 262, and into a respective threaded socket formed in an outer surface of the mandrel 256, thereby also torsionally connecting the sleeve to the mandrel while allowing limited longitudinal movement of the sleeve relative to the mandrel to accommodate operation of the slips 258. A lower portion of the spear 244 may be stabbed into a casing joint until the bumper 252 engages a top of the casing joint.

The sleeve 262 may extend along the outer surface of the mandrel from the lower flange of the linear actuator 250 to the slips 258. A lower end of the sleeve 262 may be connected to upper portions of each of the slips 258, such as by a flanged (i.e., T-flange and T-slot) connection. Each slip 258 may be radially movable between an extended position and a retracted position by longitudinal movement of the sleeve 262 relative to the slips. A slip receptacle may be formed in an outer surface of the mandrel 256 for receiving the slips 258. The slip receptacle may include a pocket for each slip 258, each pocket receiving a lower portion of the respective slip. The mandrel 256 may be connected to lower portions of the slips 258 by reception thereof in the pockets. Each slip pocket may have one or more inclined surfaces formed in the outer surface of the mandrel 256 for extension of the respective slip. A lower portion of each slip 258 may have one or more inclined inner surfaces corresponding to the inclined slip pocket surfaces.

Downward movement of the sleeve 262 toward the slips 258 may push the slips along the inclined surfaces, thereby wedging the slips toward the extended position. The lower portion of each slip 258 may also have a guide profile, such as tabs, extending from sides thereof. Each slip pocket may also have a mating guide profile, such as grooves, for retracting the slips 258 when the sleeve 262 moves upward away from the slips. Each slip 258 may have teeth formed along an outer surface thereof.

The fill up tool 246 may include a flow tube, a stab seal, such as a cup seal, a release valve, and a mud saver valve. The cup seal may have an outer diameter slightly greater than an inner diameter of the casing joint to engage the inner surface thereof during stabbing of the spear 244 therein. The cup seal may be directional and oriented such that pressure in the casing bore energizes the seal into engagement with the casing joint inner surface. An upper end of the flow tube may be connected to a lower end of the mandrel 256, such as by threaded couplings. The mud saver valve may be connected to a lower end of the flow tube, such as by threaded couplings. The cup seal and release valve may be disposed along the flow tube and trapped between a bottom of the mandrel and a top of the mudsaver valve.

The spear 244 may be capable of supporting weight of a casing string. During operation, the string weight may be transferred to the top drive unit 102 via the slips 258, the mandrel 256, the collar 254, the adapter 248, and the coupling 242. Fluid may be injected into the casing string attached to the casing tool 240 via the coupling 242, the adapter 248, the seal joint 260, the mandrel 256, the flow tube, and the mud saver valve. The spear 244 may thus have a load path separated from a flow path at the interface between the adapter 248 and the collar 254 and at the interface between the collar and the mandrel 256. This separation allows for more robust connections between the adapter 248 and the collar 254 and between the collar and the mandrel 256 than if the connections therebetween had to serve both load and isolation functions.

Figure 2E:
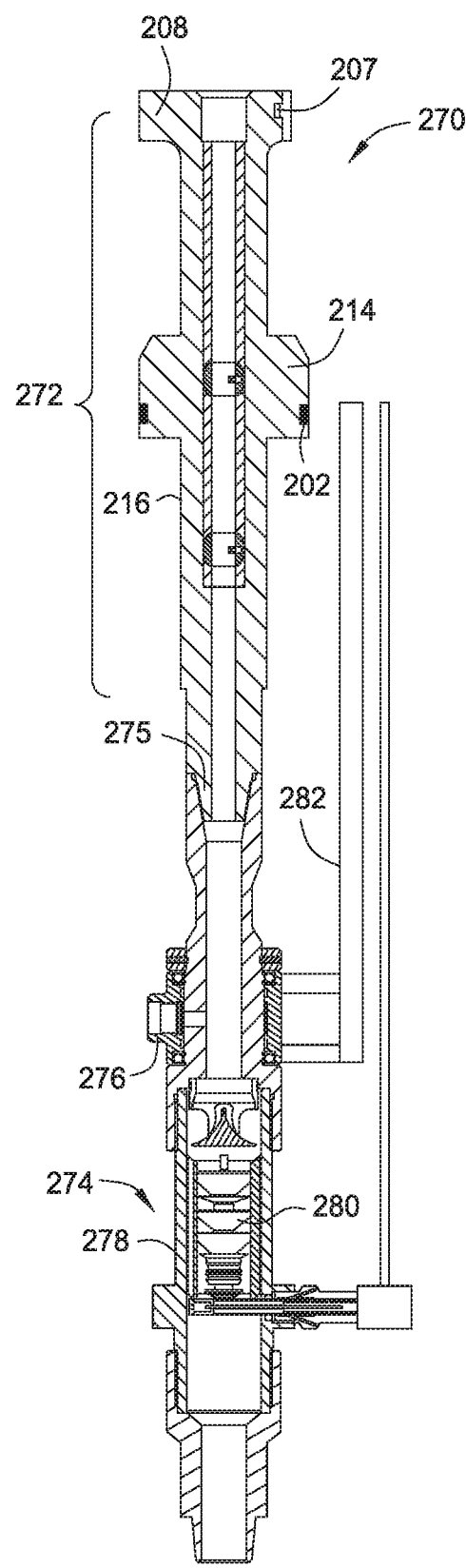
FIG. 2E is schematic sectional view of a cementing tool including an identification device according to one embodiment of the present disclosure.

FIG. 2E is schematic sectional view of a cementing tool 270 according to one embodiment of the present disclosure. The cementing tool 270 may be used in place of the cementing tool 114 in the modular top drive system 100. The cementing tool 270 may include a coupling 272 and a cementing head 274. The coupling 272 is similar to the coupling 204 of the drilling tool 200. The coupling 272 allows the cementing tool 270 to selectively attach to the top drive unit 102, store in the tool storage unit 104, and to be handled by the tool change unit 106. The coupling 272 includes one or more identification devices 202 so that the cementing tool 270 can be identified by the top drive unit 102, the tool storage unit 104, and/or the tool change unit 106. In one embodiment, the coupling 272 includes a quill 275 extending from the torso 216 for connection with the cementing head 274.

The cementing head 274 may include a cementing swivel 276, a launcher 278, and a release plug, such as a dart 280. The cementing swivel 276 may include a bar 282 for connecting with a drive body. The cementing swivel 276 may further include a mandrel and bearings for supporting the housing from the mandrel while accommodating rotation of the mandrel. An upper end of the mandrel may be connected to a lower end of the quill 275, such as by threaded couplings. The cementing swivel 276 may further include an inlet formed through a wall of the housing and in fluid communication with a port formed through the mandrel and a seal assembly for isolating the inlet-port communication. The mandrel port may provide fluid communication between a bore of the cementing head 274 and the housing inlet.

The launcher 278 may include a body, a deflector, a canister, a gate, the actuator, and an adapter. The body may be tubular and may have a bore therethrough. An upper end of the body may be connected to a lower end of the cementing swivel 276, such as by threaded couplings, and a lower end of the body may be connected to the adapter, such as by threaded couplings. The canister and deflector may each be disposed in the body bore. The deflector may be connected to the cementing swivel mandrel, such as by threaded couplings. The canister may be longitudinally movable relative to the body. The canister may be tubular and have ribs formed along and around an outer surface thereof. Bypass passages (only one shown) may be formed between the ribs. The canister may further have a landing shoulder formed in a lower end thereof for receipt by a landing shoulder of the adapter. The deflector may be operable to divert fluid received from a cement line away from a bore of the canister and toward the bypass passages. The adapter may have a threaded coupling, such as a threaded pin, formed at a lower end thereof for connection to a work string.

The dart 280 may be disposed in the canister bore. The dart 280 may be made from one or more drillable materials and include a finned seal and mandrel. The mandrel may be made from a metal or alloy and may have a landing shoulder and carry a landing seal for engagement with the seat and seal bore of a wiper plug (not shown) of the work string.

The gate of the launcher 278 may include a housing, a plunger, and a shaft. The housing may be connected to a respective lug formed in an outer surface of the body, such as by threaded couplings. The plunger may be radially movable relative to the body between a capture position and a release position. The plunger may be moved between the positions by a linkage, such as a jackscrew, with the shaft. The shaft may be connected to and rotatable relative to the housing. The actuator may be a hydraulic motor operable to rotate the shaft relative to the housing. The actuator may include a reservoir (not shown) for receiving the spent hydraulic fluid or the cementing head 274 may include a second actuator swivel and hydraulic conduit (not shown) for returning the spent hydraulic fluid to a HPU.

Figure 3C:
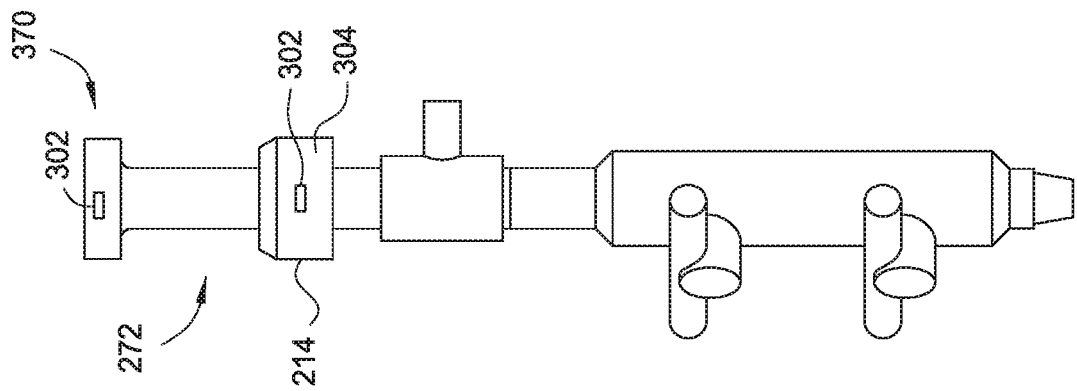
FIG. 3C is schematic sectional view of a cementing tool including an identification device according to one embodiment of the present disclosure.
Figure 3B:
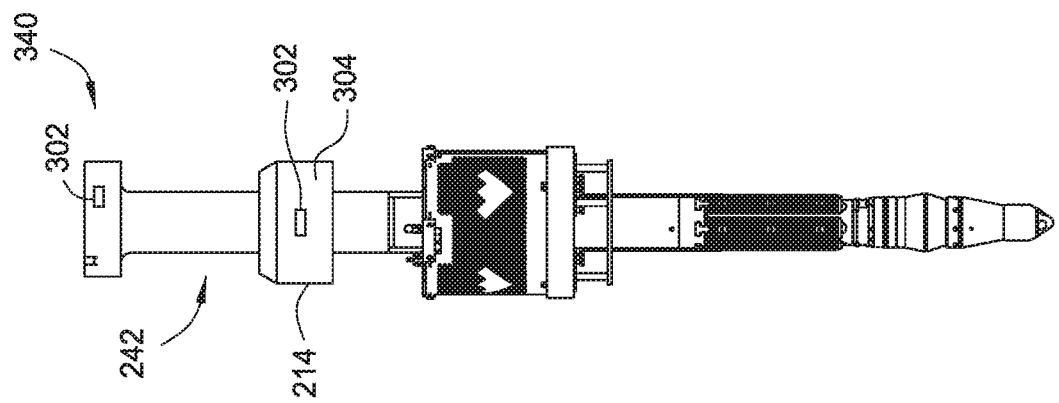
FIG. 3B is schematic sectional view of a casing tool including an identification device according to one embodiment of the present disclosure.
Figure 3A:
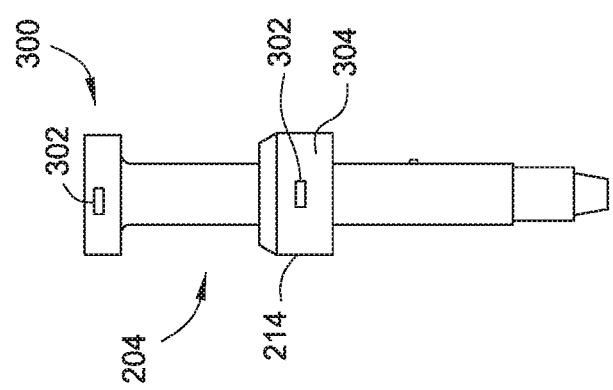
FIG. 3A is schematic sectional view of a drilling tool including an identification device according to one embodiment of the present disclosure.

FIG. 3A is schematic sectional view of a drilling tool 300 according to one embodiment of the present disclosure. The drilling tool 300 is similar to the drilling tool 200 except that the drilling tool 300 includes one or more identification labels 302 attached thereon. Each identification label 302 may include barcode and/or text containing identity information of the drilling tool 300. In one embodiment, each identification label 302 may include linear barcodes. In another embodiment, each identification label 302 may include matrix barcodes. The identification labels 302 are passive at all times producing no interference to other identification devices on the same tool or identification devices on tools nearby.

The identification label 302 may include identity information of the drilling tool 300 in the form of a product code, a product model, and/or a product name. In one embodiment, detailed information, such as operating parameters and operating history, may be stored in a data storage unit in a controller, such as the central control unit 108 in FIG. 1. The detailed information of the drilling tool 300 may be retrieved from the data storage unit once the identity information is abstracted from the identification label 302 by a reader.

The identification label 302 may be read by a barcode reader, such as a linear barcode reader or a matrix barcode reader, a camera, a camera with optical character recognition (OCR) software, or any suitable optical readers. The identification label 302 may be read when positioned in direct line of sight of a reader. In one embodiment, the drilling tool 300 may include a plurality of identification labels 302 attached to various locations on exterior of the drilling tool 300. The plurality of identification labels 302 may be positioned to allow the drilling tool 300 be identified regardless of the position and orientation. In one embodiment, a plurality of identification labels 302 may be attached to an outer surface 304 of the lifting shoulder 214. In one embodiment, the plurality of identification labels 302 may be positioned at equal intervals on the outer surface 304. For example, four identification labels 302 may be attached at 90 degrees interval on the outer surface 304. In one embodiment, a plurality of identification labels 302 may be attached the coupling 204. In one embodiment, the plurality of identification labels 302 may be positioned at equal intervals on the coupling 204.

FIG. 3B is schematic sectional view of a casing tool 340 according to one embodiment of the present disclosure. The casing tool 340 is similar to the casing tool 240 except that the casing tool 340 includes one or more identification labels 302 attached thereon. As discussed with the drilling tool 300, each identification label 302 may include barcode (linear barcode and/or matrix barcode) and/or text containing identity information. In one embodiment, the casing tool 340 may include a plurality of identification labels 302 attached to various locations on exterior of the casing tool 340. The plurality of identification labels 302 may be positioned to allow the casing tool 340 be identified regardless of the position and orientation. In one embodiment, the plurality of identification labels 302 may be attached to an outer surface 304 of the lifting shoulder 214. In one embodiment, the plurality of identification labels 302 may be positioned at equal intervals on the outer surface 304. For example, four identification labels 302 may be attached at 90 degrees interval on the outer surface 304.

FIG. 3C is schematic sectional view of a cementing tool 370 according to one embodiment of the present disclosure. The cementing tool 370 is similar to the cementing tool 270 except that the cementing tool 370 includes one or more identification labels 302 attached thereon. As discussed with the drilling tool 300, each identification label 302 may include linear barcode, matrix barcode and/or text containing identity information. In one embodiment, the cementing tool 370 may include a plurality of identification labels 302 attached to various locations on exterior of the cementing tool 370. The plurality of identification labels 302 may be positioned to allow the cementing tool 370 be identified regardless of the position and orientation. In one embodiment, the plurality of identification labels 302 may be attached to an outer surface 304 of the lifting shoulder 214. In one embodiment, the plurality of identification labels 302 may be positioned at equal intervals on the outer surface 304. For example, four identification labels 302 may be attached at 90 degrees interval on the outer surface 304.

Figure 4A:
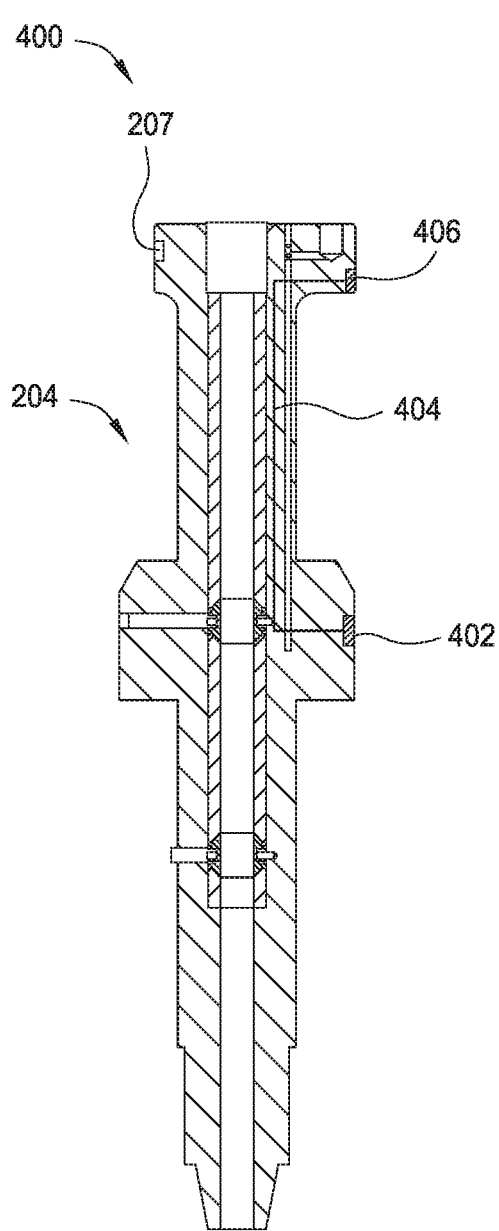
FIG. 4A is schematic sectional view of a drilling tool including an identification device according to one embodiment of the present disclosure.

FIG. 4A is schematic sectional view of a drilling tool 400 according to one embodiment of the present disclosure. The drilling tool 400 is similar to the drilling tool 200 except that the drilling tool 400 includes an active identification device 402. The active identification device 402 may actively transmit identification information to other units, such as the top drive unit 102, the tool storage unit 104, and the tool change unit 106.

The active identification device 402 may include a microcontroller using logic device. Alternatively, the active identification device 402 may include an industrial PC. The active identification device 402 may include a data storage unit. In one embodiment, the active identification device 402 may include a wireless transmitter configured to send information of the drilling tool 400 by wireless communications. The active identification device 402 does not require direct line of sight with a reader, therefore, may be positioned at any suitable location on the drilling tool 400. Alternatively, the active identification device 402 may be activated, read and/or re-written by wired communications.

In one embodiment, the active identification device 402 may include a power supply, such as a battery unit. Alternatively, the active identification device 402 may include electrical circuits for receiving external power. As shown in FIG. 4A, the drilling tool 400 may include one or more conductive pads 406 formed on an exterior surface. Each conductive pad 406 may be connected to the active identification device 402 by a wire 404. The one or more conductive pads 406 may be configured to form electrical connection with an external power supply, for example, a power output on the top drive unit 102, the tool storage unit 104, and the tool change unit 106. In another embodiment, wireless power transfer may be used to power the active identification device 402. Alternatively, the active identification device 402 may include an internal power source. For example, the active identification device 402 may include a power generator, such as a hydraulic generator that generates electrical power by hydraulics. In another embodiment, some of one or more conductive pads 406 may be adapted to connect with an interface on an external unit, such as the top drive unit 102, the tool storage unit 104, and the tool change unit 106, to transmit signals between the active identification device 402 and the external unit.

In one embodiment, the one or more conductive pads 406 may be positioned on external surfaces of the coupling 204 so that the active identification device 402 may be activated by the top drive unit 102, the tool storage unit 104, or the tool change unit 106 during operation. In one embodiment, the one or more conductive pads 406 and the wire 404 may be electrically insulated from the coupling 204.

Figure 4B:
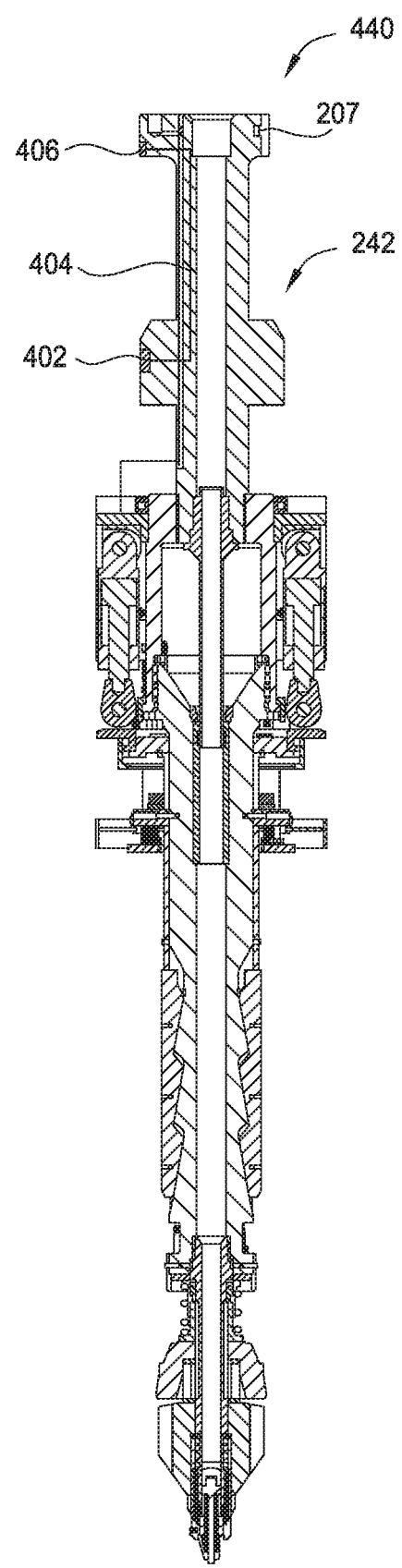
FIG. 4B is schematic sectional view of a casing tool including an identification device according to one embodiment of the present disclosure.

FIG. 4B is schematic sectional view of a casing tool 440 according to one embodiment of the present disclosure. The casing tool 440 is similar to the casing tool 240 except that the casing tool 440 includes an active identification device 402. As discussed with the drilling tool 400, the active identification device 402 may include a microcontroller, and a data storage unit. In one embodiment, the active identification device may include a transmitter, such as a transmitter for wireless communications. The active identification device 402 may include a battery unit or may be powered by external power source through the conductive pad 406 and the wire 404.

Figure 4C:
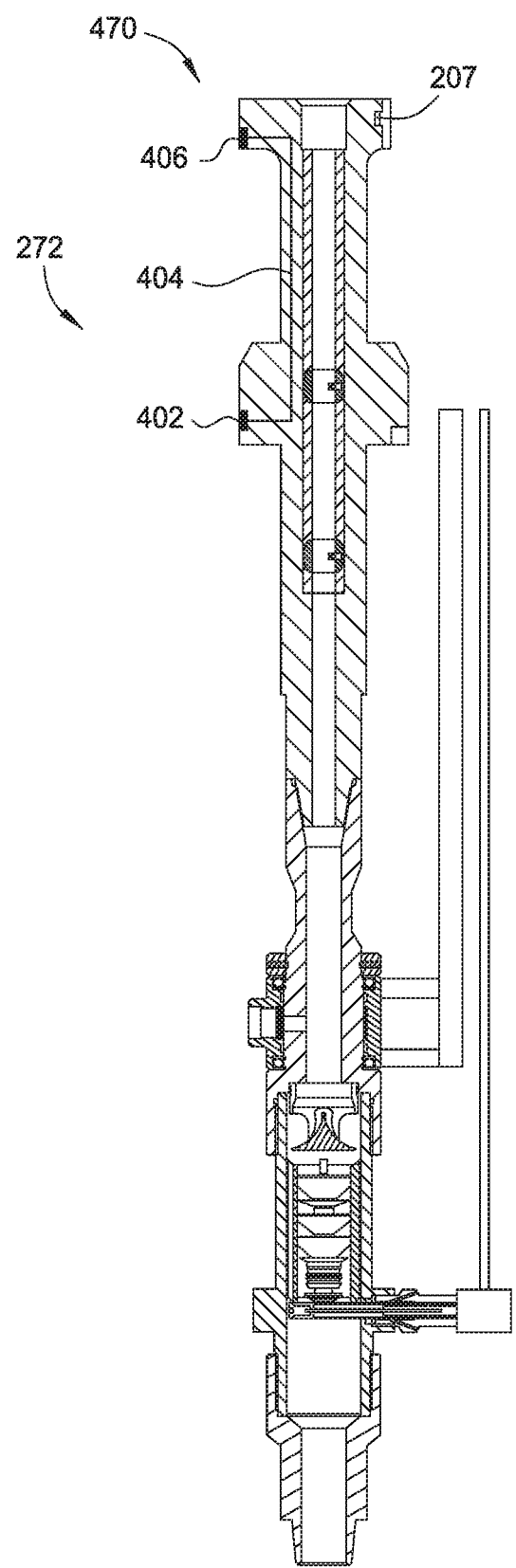
FIG. 4C is schematic sectional view of a cementing tool including an identification device according to one embodiment of the present disclosure.

FIG. 4C is schematic sectional view of a cementing tool 470 according to one embodiment of the present disclosure. The cementing tool 470 is similar to the cementing tool 270 except that the cementing tool 470 includes an active identification device 402. As discussed with the drilling tool 400, the active identification device 402 may include a microcontroller, and a data storage unit. In one embodiment, the active identification device 402 may include a transmitter for wireless transmission. The active identification device 402 may include a battery unit or may be powered by external power source through the conductive pad 406 and the wire 404.

The tools discussed above may be used in a top drive system capable of reading the identification devices in or on the tools. For example, the tools may be used in the modular top drive system 100, where at least one of the top drive unit 102, the tool storage unit 104, and the tool change unit 106 is capable of reading the identification devices. By using tools with identification devices, the modular top drive system 100 is capable of performing automatic tool exchange.

In one embodiment, tool identification may be performed by the tool storage unit 104. The tool storage unit 104 may perform tool identification routinely or upon receiving a trigger and send information of identity and location of the tools to the central control unit 108. The central control unit 108 may share identification and location of the tools with other units, such as the tool change unit 106 and the top drive unit 102, in the modular top drive system 100. Exemplary tool storage units capable of identifying tools are described below.

Figure 5A:
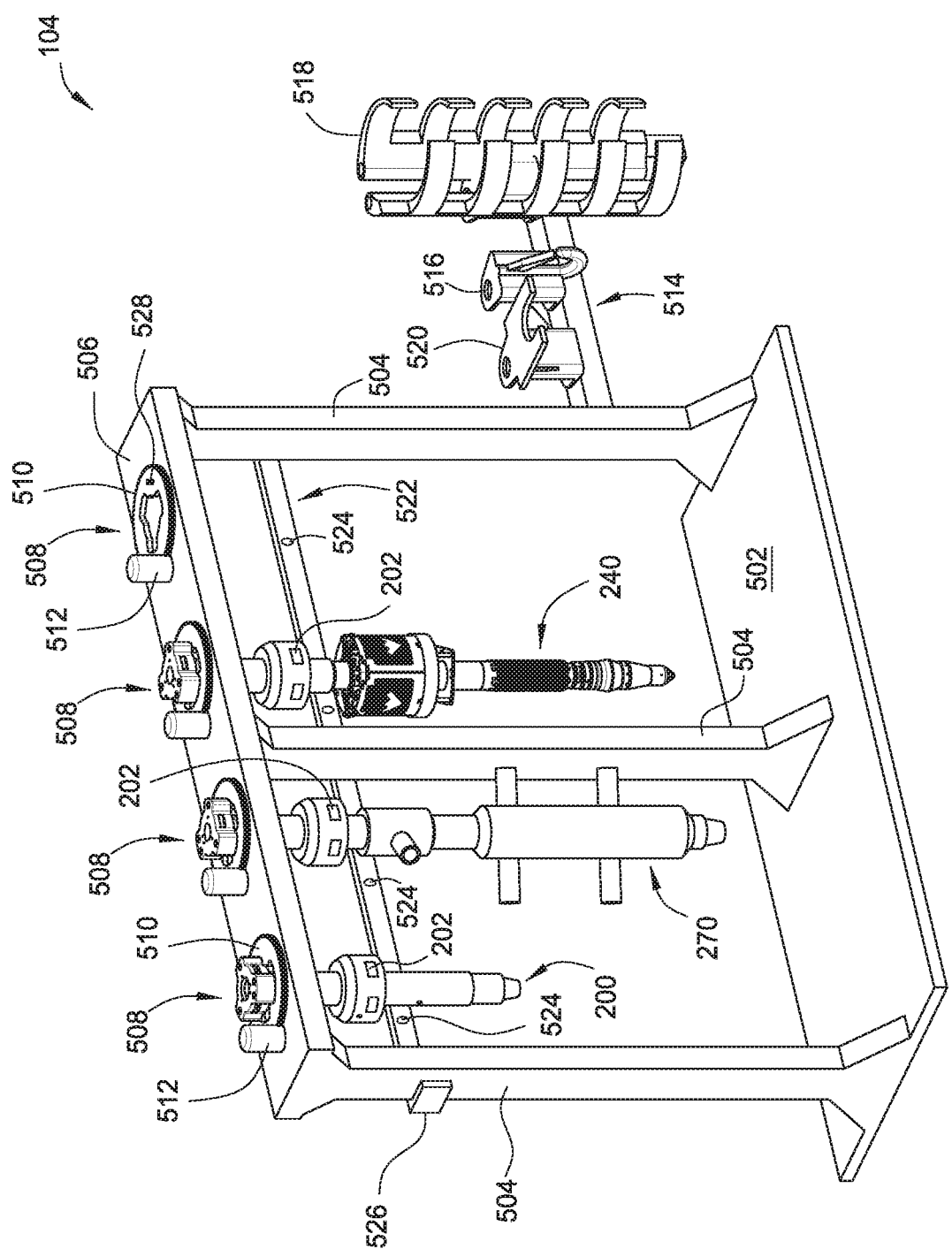
FIG. 5A is a schematic perspective view of a tool storage unit capable of identifying tools according to one embodiment of the present disclosure.

FIG. 5A is a schematic perspective view of the tool storage unit 104 according to one embodiment of the present disclosure. The tool storage unit 104 is capable of identifying tools, such as the drilling tools 200, 300, 400, the casing tools 240, 340, 440, and the cementing tools 270, 370, 470 described above.

The tool storage unit 104 may include a base 502, a beam 506, two or more (three shown) columns 504 connecting the base to the beam 506, such as by welding or fastening, and one or more parking spots 508 for tools, such as the drilling tools 200, 300, 400, casing tools 240, 340, 440, and cementing tools 270, 370, 470. Four parking spots 508 are shown in FIG. 5A. However, the tool storage unit 104 may include any suitable number of parking spots 508 according to needs. Tools, the drilling tool 200, the casing tool 240, and the cementing tools 270, may be hung from the beam 506 by engagement of the parking spots 508 with respective couplings 204 of the tools. Each parking spot 508 may include an opening formed through the beam 506, a ring gear 510, and a motor 512. Each ring gear 510 may be supported from and transversely connected to the beam 506 by a bearing (not shown) such that the ring gear 510 may rotate relative to the beam 506. Each bearing may be capable supporting the weight of any of the tools and placement of a particular tool in a particular parking spot 508 may be arbitrary. Each ring gear 510 may have an internal latch profile, such as a bayonet profile, to latch with the bayonet profile in the coupling 204, 242, 272 of each tool.

The tool storage unit 104 may further include a side bar 514 for holding one or more accessories, such as a cargo hook 516 and a pipe clamp 518. The side bar 514 may also hold a tool holder 520 used by the tool change unit 106.

In one embodiment, the tool storage unit 104 may include a tool identifying unit 522. The tool identifying unit 522 may include a plurality of readers 524 disposed on a frame 526. Each of the plurality of readers 524 may be positioned to read identification devices on tools disposed on a corresponding parking spot 508. In one embodiment, each reader 524 may include a RFID reader having two-way radio transmitter-receiver for reading RFIDs. When a tool is disposed on a corresponding parking spot 508, the reader 524 may send a signal to the RFID devices on the tool and read responses from the RFID devices. In one embodiment, the reader 524 may be a barcode reader, such as a linear barcode reader or a matrix barcode reader, configured to read barcodes on an identification tag of a tool. In another embodiment, the reader 524 may be a camera positioned at a direct line of sight with an identification label on a tool loaded in the corresponding parking spot 508. The camera may capture an image of a portion of the tool with an identification tag. In one embodiment, the reader 524 may include an optical sensor configured to detect presence or non-presence of a tool in the corresponding parking spot 508. The optical sensor may be used to trigger the reader 524 to initiate an identifying process.

Alternatively, the tool storage unit 104 may include one or more connection pads 528. In one embodiment, the one or more connection pads 528 may be connected to a power source to supply electrical power to active identification devices on tools disposed in the parking spot 508. In another embodiment, the one or more connection pads 528 may be connected to an input/output interface of a controller to exchange signals with identification devices in tools disposed in the parking spot 508. In one embodiment, one or more connection pads 528 may be formed on the ring gear 510 in each parking spot 508. When a tool is stored in a parking spot 508, the one or more connection pads 528 are in contact with the tool. The ring gear 510 may rotate so that the one or more connection pads 528 connect with a conductive pad, such as conductive pads 406 in the drilling tool 400, the casing tool 440, or the cementing tool 470.

In one embodiment, the plurality of readers 524 may be connected to a control system, such as the central control unit 108, by wired or wireless communication. By receiving information from the plurality of readers 524, the control system knows which tool is in which location.

The tool storage unit 104 may perform tool identification routinely or automatically triggered by certain events, such as tool loading, tool unloading, or when an external tool handler, such as the tool change unit 106, needs to pick up a particular tool. For example, when a tool is loaded to a parking spot 508, the corresponding reader 524 retrieves identify information of the tool and sends the tool identification to a controller to update the inventory of the tool storage unit 104. In the embodiment where the reader 524 includes a RFID reader, the RFID reader may transmit query signals and detect response signal from the RFID on the tool. The RFID reader interprets the response signal to abstract information of the tool, such as identity information. The RFID reader may then send the identification information to the control system. In the embodiment, where the reader 524 includes a barcode reader, such as a linear barcode reader or a matrix barcode reader, the reader 524 detects and reads the barcode, and sends the barcode to the control system. In the embodiment wherein the reader 524 includes a camera, the camera captures an image of an identification tag, and sends the image to a computer where texts and/or barcode in the image can be recognized.

Figure 5B:
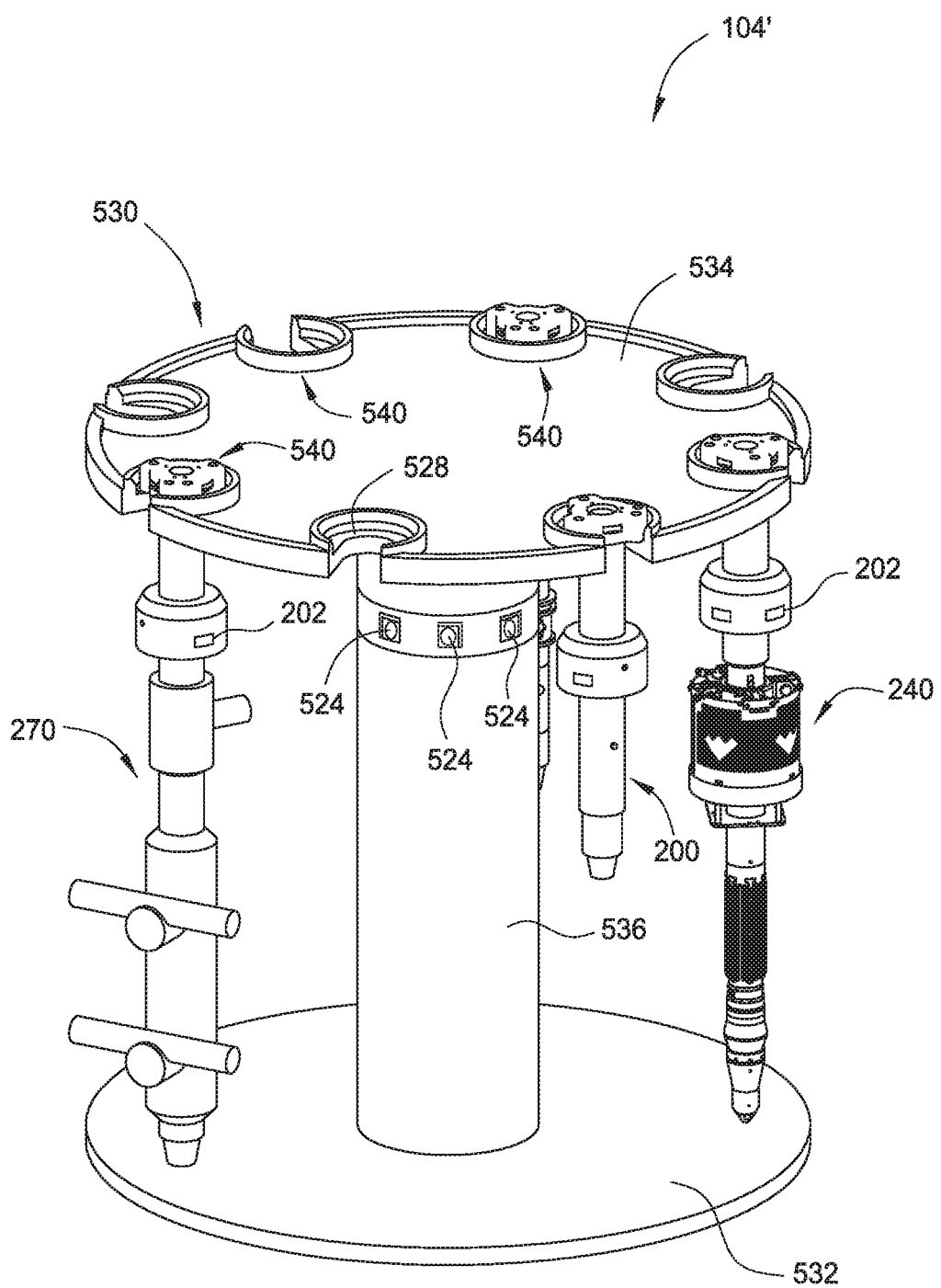
FIG. 5B is a schematic perspective view of a tool storage unit capable of identifying tools according to another embodiment of the present disclosure.

FIG. 5B is a schematic perspective view of a tool storage unit 104' according to another embodiment of the present disclosure. The tool storage unit 104' is similar to the tool storage unit 104 except that the tool storage unit 104' includes a carousel 530 for supporting tools. The carousel 530 may include a lower turntable 532, an upper disk 534, and a shaft 536 connecting the lower turntable 532 and the upper disk 534. The lower turntable 532 may be driven by a motor (not shown). A plurality of parking spots 540 may be formed at an outer perimeter of the upper disk 534 for receiving tools. Particularly, each parking spot 540 may include a notch for receiving support tools 200, 240, 270 at the respective couplings 204, 242, 272. The carousel 530 may allow maintenance/initial loading on one side while deployment of a tool on another side. Alternatively, the lower turntable 532 may be a fixed base and the upper disk 534 may be a turntable instead.

The tool storage unit 104' includes one or more readers 524 positioned to identify tools disposed in the plurality of parking spots 540. In one embodiment, a plurality of readers 524 may be attached to the shaft 536, each reader 524 corresponds to a parking spot 540. Alternatively, the tool storage unit 104' may include one reader 524 fixedly positioned adjacent to an identifying position. The rotation of the upper disk 534 allows the tools in every parking spot 540 to align with the reader 524 during identification.

Alternatively, the tool storage unit 104' may include one or more connection pads 528 at each parking spot 540 where a tool contacts the parking spot 540. The one or more connection pads 528 may be connected to a power source to supply electrical power to active identification devices or connected to an input/output interface of a controller to exchange signals with identification devices. In one embodiment, the active identification devices may be powered by wireless power transfer. In another embodiment, the active identification devices may include an internal power source, such as a power generator or a battery unit.

In another embodiment, tool identification may be performed by the tool change unit 106. For example, the tool change unit 106 may perform tool identification while picking up a tool from the tool storage unit 104 before rig up. Exemplary tool change units capable of identifying tools are described below.

FIG. 6A is a schematic perspective partial view of the tool change unit 106 having a reader 602 according to one embodiment of the present disclosure. Similar to the reader 524, the reader 602 may be capable of reading RFIDs, barcodes, such as linear barcodes and matrix barcodes, and/or capturing images of texts on identity tags for recognition. In one embodiment, the reader 602 may include an RFID reader. In another embodiment, the reader 602 may include a barcode reader, such as a linear barcode reader or a matrix barcode reader. In another embodiment, the reader 602 may include a camera. The reader 602 may be connected to a controller, such as the central control unit 108, where the identification of the tool may be processed.

In one embodiment, the reader 602 may be attached to the tool holder 174 of the tool change unit 106. FIG. 6B is a partial enlarged view of the tool holder 174 where the reader 602 is attached to an upper surface of the tool holder 174. When the tool holder 174 approaches a tool, the reader 602 is within a range to read an RFID on the tool or in a directly line of sight of an identification tag on the tool.

FIG. 6C is a partial perspective view of a tool change unit 106' according to one embodiment of the present disclosure. The tool change unit 106' is similar to the tool change unit 106 except that the tool change unit 106' includes a reader 606 attached to the forearm 170 by a bracket 604.

FIG. 6D is a partial sectional view of a tool change unit 106" according to another embodiment of the present disclosure. The tool change unit 106" includes one or more connection pads 608 formed on the tool holder 174. In one embodiment, the one or more connection pads 608 may be connected to a power source to supply electrical power to active identification devices or connected to an input/output interface of a controller to exchange signals with identification devices. The one or more connection pads 608 may be positioned to establish physical contact with a tool with active identification devices, such as the drilling tool 400. Alternatively, signal and/or power communication with the identification devices may be established by wireless communication. The one or more connection pads 608 may contact the conductive pad 406 of the drilling tool to power up or establish wired connection with the active identification device 402.

The modular top drive system 100 may use the tool change unit 106, 106' or 106" to identify a tool during rig-up. When it is time to rig up a tool to the top drive unit 102, the central control unit 108 may command the tool change unit 106, 106', 106" to move towards the tool storage unit 104 to identify and pick up the correct tool.

The tool change unit 106 may move the reader 602, 604 close to a tool in the tool storage unit 104 to retrieve identification information of the tool. In case the identification device in the tool is a passive device, such as an RFID, linear barcodes, matrix barcodes, or texts, the reader 602 may read the identification device before gripping the tool.

In one embodiment, the reader 602 may send the identification information to the central control unit 108. If the central control unit 108 confirms the tool to be the correct one, the tool change unit 106, 106', 106" moves forward to grip the tool from the tool storage unit 104 and transfer the tool to the top drive unit 102 for installation. However, if the central control unit 108 determines that the tool is not the correct one, the tool change unit 106, 106', 106" moves to the next tool in the tool storage unit 104 until the correct tool is located. Alternatively, the identification may be performed in the tool change unit 106, 106', 106" directly, and the tool change unit 106, 106', 106" will pick up the tool once the correct tool is identified.

In case the tool in the tool storage unit 104 has an active identification device, such as a micro-controller, the tool change unit 106' moves to grip the tool to power up the active identification device. Alternatively, the active identification device may be powered with the tool storage unit 104. Once powered up, the active identification device can transfer the identification information to the tool change unit 106". Upon identification, if the tool is the correct tool, the tool change unit 106" transfers the tool to the top drive unit 102. If the tool is not the correct tool, the tool change unit 106" returns the tool back to the tool storage unit 104 and moves to the next tool.

Figure 7A:
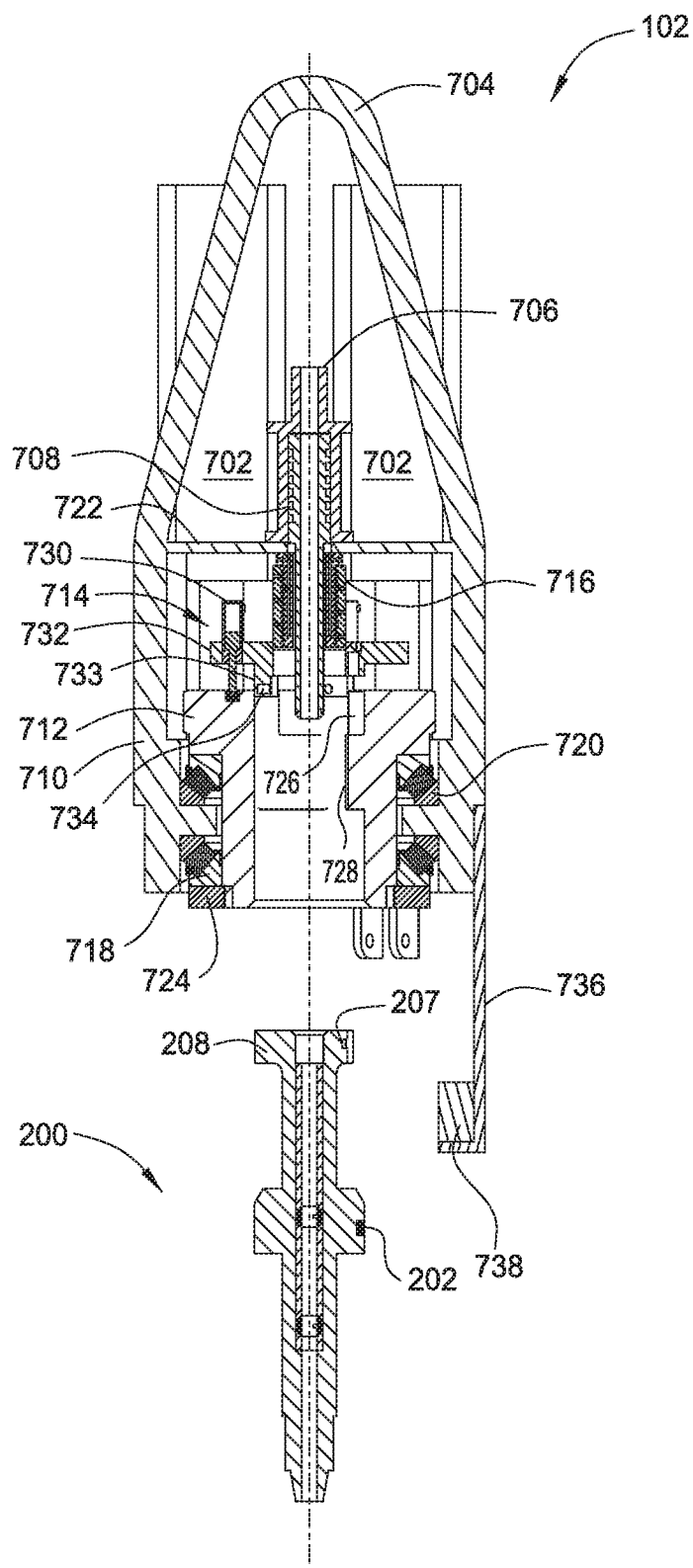
FIG. 7A is a schematic sectional view of a top drive unit capable of identifying tools according to one embodiment of the present disclosure.

In another embodiment, tool identification may be performed in the top drive unit 102. FIG. 7A is a schematic sectional view of the top drive unit 102 capable of identifying tools according to one embodiment of the present disclosure.

The top drive unit 102 may be a motor unit having one or more drive motors 702. Stator of the one or more drive motors 702 may be connected to a drive body and rotors of the one or more drive motors 702 may be torsionally connected to a drive ring 712. The drive ring 712 may have a latch profile for selectively connecting one of: a drilling tool, a casing tool, a cementing tool, a completion tool, a fracturing tool, a pump, a sand screen, a clamping tool, an internal gripping tool, an external gripping tool, an adaptor, and a combination thereof to the motor unit. The top drive unit 102 may also include a becket 704, a hose nipple 706, a mud swivel 708, a thread compensator 714, a swivel 716, a down thrust bearing 718, an up thrust bearing 720, a swivel frame 722, a bearing retainer 724.

The drive body 710 may be connected to the rail 124 by a trolley. For example, a trolley may be fastened to a back of the drive body 710. The trolley may be transversely connected to a front of the rail 124 and may ride along the rail, thereby torsionally restraining the drive body 710 while allowing vertical movement of the top drive unit 102.

The drive body 710 may be rectangular and have thrust chambers formed therein. In one embodiment, the drive body 710 may have an inner rib dividing the thrust chambers. The drive body 710 may have a central opening formed therethrough and in communication with the chambers.

The drive ring 712 may be movable disposed in the drive body 710. The thrust bearings 718, 720 are disposed between the drive ring 712 and the drive body 710 allowing the drive ring 712 to rotate relative to the drive body 710.

The drive ring 712 may have an inner locking profile 726 formed at an upper end thereof and an inner latching profile 728 formed adjacently below the inner locking profile 726. In one embodiment, the inner latching profile 728 may be a bayonet profile matching the external profile 210 of the coupling 204 in the tools discussed above.

Each thrust bearing 718, 720 may include a shaft washer, a housing washer, a cage, and a plurality of rollers extending through respective openings formed in the cage. The shaft washer of the down thrust bearing 718 may be connected to the drive ring 712 adjacent to a bottom of the flange thereof. The housing washer of the down thrust bearing 718 may be connected to the drive body 710 adjacent to a top of the rib thereof. The cage and rollers of the down thrust bearing 718 may be trapped between the washers thereof, thereby supporting rotation of the drive ring 712 relative to the drive body 710. The down thrust bearing 718 may be capable of sustaining weight of either a drill string or a casing string during rotation thereof. The shaft washer of the up thrust bearing 720 may be connected to the drive ring 712 adjacent to the bearing retainer 724. The housing washer of the up thrust bearing 720 may be connected to the drive body 710 adjacent to a bottom of the rib thereof. The cage and rollers of the up thrust bearing 720 may be trapped between the washers thereof. The bearing retainer 724 may have an inner thread engaged with the outer thread of the drive ring 712, thereby connecting the down thrust bearing 718 to the drive ring 712.

The drive motors 702 may be electric (shown) or hydraulic (not shown) and have a rotor and a stator. The motors 702 may be operable to rotate the rotor relative to the stator which may also torsionally drive the drive ring 712 via gears. Alternatively, the top drive unit 102 may instead be a direct drive unit having the drive motor 702 centrally located.

The hose nipple 706 may be connected to the mud swivel 708 and receive an end of a mud hose to deliver drilling fluid. The mud swivel 708 may be connected to a top of the swivel frame 722, such as by fastening. The swivel frame 722 may be connected to a top of the drive body 710, such as by fastening.

The hydraulic swivel 716 is configured to provide hydraulic connections to the tools attached to the top drive unit 102. The hydraulic swivel 716 may include a non-rotating inner barrel and a rotating outer barrel. The inner barrel may be connected to the swivel frame 722 and the outer barrel may be supported from the inner barrel by one or more bearings. The outer barrel may have hydraulic ports (six shown) formed through a wall thereof, each port in fluid communication with a respective hydraulic passage formed through the inner barrel (only two passages shown). Alternatively, the top drive unit 102 may include a universal coupler to lock a tool to the drive ring 712 and/or to provide electrical and/or hydraulic connections to the tool.

The thread compensator 714 may include a linear actuator 730, a locking ring 732, and one or more (such as three, but only one shown) locking pins 734. The locking ring 732 may include a locking head 733 extending into the locking profile 726 of the drive ring 712. The linear actuator 730 may move the locking ring 732 vertically so that the locking head 733 moves vertically in the drive ring 712. In one embodiment, the locking head 733 may have a profile that allows the locking head 733 mate with the external prongs 210*p* of the coupling 204 of the tools discussed above. The locking pins 734 may be pistons. In one embodiment, when the locking head 733 mates with the external prongs 210*p* of the coupling 204, the locking pins 734 may align with the locking slots 207 of the coupling 204 and extend therein to secure the locking ring 732 to the coupling 204.

The top drive unit 102 may include an identification reader 738 configured to read identification tools approaching the top drive unit 102. In one embodiment, the identification reader 738 may be attached to the drive body 710 by a bracket 736. In one embodiment, two or more identification readers 738 may be mounted at various locations to make sure at least one identification reader 738 has a direct line of sight or is within the range of the identification devices of the tool. In one embodiment, the one or more identification reader 738 may be disposed on the top drive unit 102 along the path of a tool while the tool is being installed. For example, one or more identification reader 738 may be disposed on the drive ring 712 and/or the locking ring 732. In another embodiment, the at least one identification reader 738 may be disposed on a location to read the identification devices on a tool when the tool is installed on the top drive unit 102. In another embodiment, the bracket 736 may be movable relative to the drive body 710 to align with identification devices on the tool. In another embodiment, one or more identification readers 738 may be mounted on a rotating part of the top drive unit 102, such as on the drive ring 712. The top drive unit 102 may rotate the drive ring 712 with one or more identification readers 738 attached thereon to align the one or more identification readers 738 with the identification devices on the tool.

The identification reader 738 may query identification devices on a tool when the tool is raised towards the top drive unit 102, for example, by the tool change unit 106. In one embodiment, the identification reader 738 may be similar to the readers 524, 602 described above. The identification reader 738 may be a RFID reader, a barcode reader, or a camera.

In case when the tool change unit 106 or the tool storage unit 104 does not or could not check the identification of the tool, the identification reader 738 on the top drive unit 102 may be used to check the identification of the tool to make sure the correct tool is being rigged up.

During operation, a tool handler, such as the tool change unit 106 may raise a tool, such as the drilling tool 200, until the tool is adjacent the reader 738 below the bottom of the drive ring 712 so that the reader 738 can read the identification devices on the tool. After obtaining the identification information of the tool, the reader 738 may determine locally or send to the central control unit 108 to determine if the tool is the correct one. If the tool is not correct, the central control unit 108 may command the tool handler to retrieve another tool until the correct tool is identified.

Once the correct tool is identified, the drive motors 702 may then be operated to rotate the drive ring 712 until the latching profile 728 of the drive ring 712 aligns with the external prongs of the head 208. The drive ring 712 may have visible alignment features, such as cameras, for alignment. Once aligned and oriented, the tool change unit 106 may be raised to lift the coupling 204 of the drilling tool 200 into the drive ring 712 until the head 208 passes the latching profile 728 and enters the locking profile 726 thereof. The locking ring 732 may be in a lower position, such as the hoisting position, such that the top of the head 208 contacts the locking ring 732 and pushes the lock ring upward. Proximity sensor (not shown) may be used to determine alignment of the head 208 with the locking profile 726 by measuring the vertical displacement of the locking ring 732. Once alignment has been achieved, the compensator actuator 730 may be operated to move the locking ring 732 to the ready position. The drive motors 702 may then be operated to rotate the drive ring 712 until sides of the external prongs of the head 208 engage respective stop lugs of the locking profile 726, thereby aligning the external prongs of the head 208. The compensator actuator 730 may then be operated to move the locking ring 732 to the hoisting position, thereby moving the locking head 733 into the external prong-ways of the head 208 and aligning the locking pins 734 with the respective locking slots 207. Movement of the locking ring 732 may also make hydraulic junction between the drilling tool 200 and the top drive unit 102. The drilling tool 200 is now longitudinally and torsionally connected to the drive ring 712.

Figure 7B:
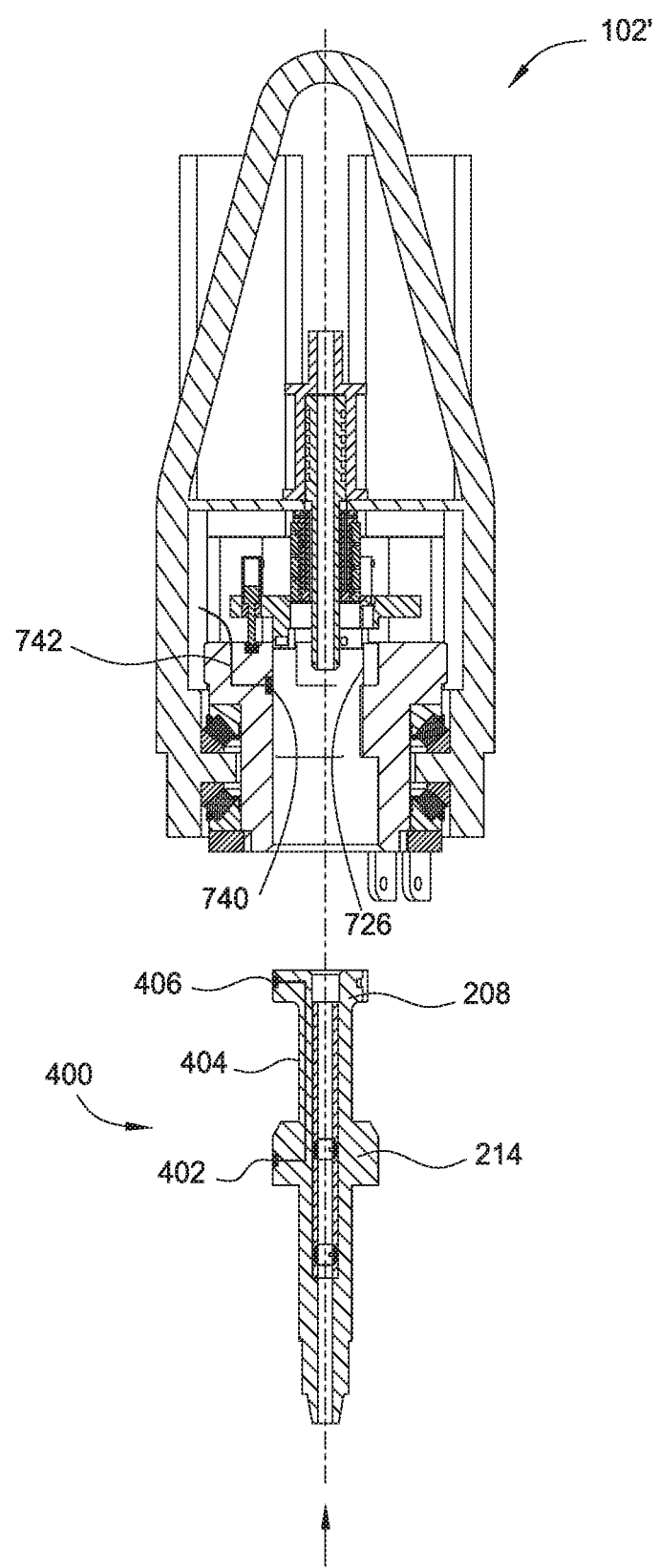
FIG. 7B is a schematic sectional view of a top drive unit capable of identifying tools according to one embodiment of the present disclosure.

FIG. 7B is a schematic sectional view of a top drive unit 102' according to one embodiment of the present disclosure. The top drive unit 102' is similar to the top drive unit 102 except that the top drive unit 102' includes one or more connection pads 740 configured to provide electrical power and/or wired connection to identification devices, such as active identification devices, in tools. Each connection pad 740 may be coupled to a connection 742. The connection 742 may be coupled to a power source or an input/output interface of a controller, such as the central control unit 108. The one or more connection pads 740 may be formed on a surface of the drive ring 712 that contacts the tool during operation and/or alignment. In one embodiment, the one or more connection pads 740 may be formed on the inner locking profile 726 to make connection of conductive pads 406 on the head 208 of the coupling 204. Alternatively, the one or more connection pads 740 may be coupled to any suitable locations. Alternatively, wireless power transfer may be used to provide electrical power to the tool.

Figure 7C:
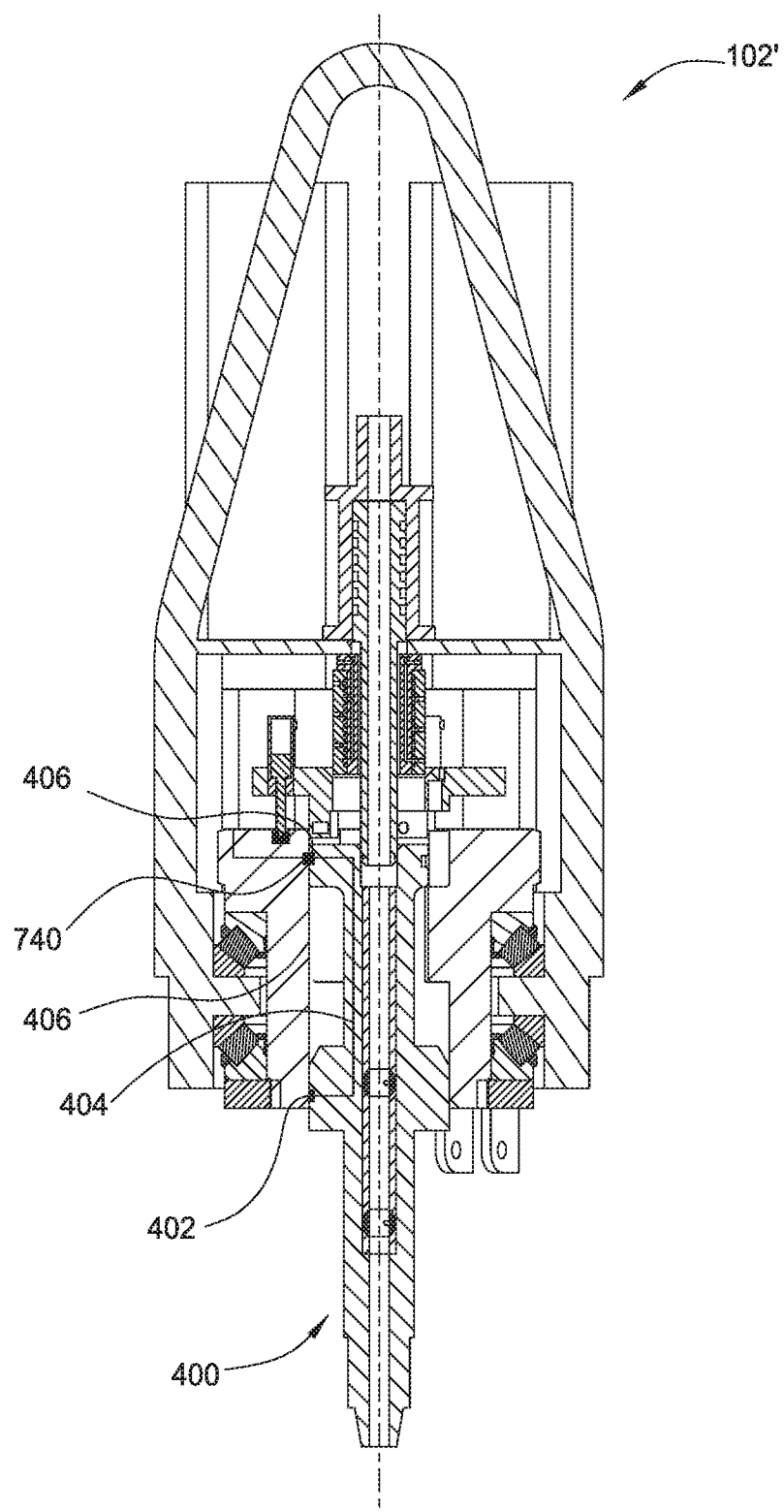
FIG. 7C is a schematic section view of the top drive unit of FIG. 7B having a drilling tool attached thereon.

FIG. 7C is a schematic section view of the top drive unit 102' in position of identifying the drilling tool 400. The coupling 204 of the drilling tool 400 is inserted into the drive ring 712 so that the one or more connection pads 740 are electrically connected to the one or more conductive pads 406 of the drilling tool 400. The active identification device 402 of the drilling tool 400 is therefore connected and the identification of the drilling tool 400 is obtained. If the drilling tool 400 is the correct tool, the drive ring 712 will rotate to lock the drilling tool 400 in and complete the rigging up procedure. If the drilling tool 400 is not the correct tool, a tool handler, such as the tool change unit 106, will lower the drilling tool 400 out of the drive ring 712 and fetch an alternative tool.

According to one embodiment of the present disclosure, identification devices on tools, such as the drilling tools, the casing tools, and the cementing tools, may be used to store operational information in addition to identification information. For example, the identification devices may be used to store running time of a tool, running time of a tool used on a particular top drive, and operational range of a tool, such as torque, pressure, and tonnage. The running time may be used to monitor the life time of the tool. The running time of a tool used on a particular top drive may be used to assist tool rental. The additional information may be updated by re-writing identification devices on a tool. The re-writing may be performed by a writer when the tool interacts with the tool storage unit, the tool change unit, or the top drive unit. The writer may be a RFID writer attached to tool storage unit, tool change unit or tool drive unit. Alternatively, the writer may be a micro-controller in an active identification device upon receiving commends from a central unit controller. Alternatively, tool information may be updated by replacing the existing tool identification device with a new identification device. When the tool identification device includes barcode tags, or text tags, updated tool information may be incorporated in new tags, which may replace with the existing tags. In one embodiment, the tags may be replaced manually.

In one embodiment of the present disclosure, the top drive unit, the tool change unit or the tool storage unit may include one or more identification devices, such as RFIDs, barcode tags, and/or text tags. The identification devices may be read by various identification readers and used to provide location of the identification reader or the location of the top drive unit, the tool change unit or the tool storage unit.

In one embodiment, one or more tool may include an identification reader configured to read identification devices disposed on the top drive unit, the tool change unit or the tool storage unit. The identification reader on the tool may be used to provide location of the tool by reading identification devices on location markers, such as the top drive unit, the tool change unit, the tool storage unit. The identification reader may be used to read identification devices disposed on other components of the system, such as the top drive unit, the tool change unit, the tool storage unit, or other tools. In one embodiment, the identification reader tool may be powered by an internal power supply, such as batteries, a power generator, or by an external power supply. In one embodiment, the identification reader on the tool may be powered by an external power supply through the drive unit, the tool change unit or the tool storage unit by wired connection or wireless connection. Alternatively the tool may include a battery or a power generation configured to provide power supply to the identification reader.

During process, when a tool including an identification reader receives a trigger to read. For example, a trigger to read may be generated when power is provided to the identification reader from that the drive unit, the tool change unit or the tool storage unit or, if the identification reader is already powered, when the identification reader receives a command, for example a command from the central control unit.

The identification reader on the tool reads the identification devices, the identification device on the tool change unit, the top drive unit, or the tool storage unit, and transfers to the central control system the identification of the tool itself along with the identification information of the identification device being read. The central control unit may correlate the identification information of the tool and the identification device being read and determine a location of the tool. In one embodiment, each parking spot of the tool storage unit may have different ID, so the identification reader on the tool can read the ID in each parking spot in the storage unit and transfer IDs of its own and the parking spot to let the system know the position of the tool.

Embodiments of the present disclosure also include a modular central control system adapted to control various tools or parts that may be selectively connected the modular top drive system described above. The modular central control system may include a central control unit configured to communicate with and control various tools, including modular tools or parts that selectively connect to the system or permanent tools in the system. A tool or part that can be connected to the modular top drive system may have an independent controller. In one embodiment, the tool or part may have a modular controller. When a modular tool or part is added or connected to the modular top drive system, the corresponding modular controller may be added to or activated in a central controller, such as the central control unit 108 of FIG. 1. When a tool or part that does not include a microcontroller of its own is connected to the modular top drive system, an identification of the tool or part can be sent to the central control unit so that a corresponding program can be loaded and activated in the central control unit. When a new part is introduced, the modular central control system can be updated simply by adding a new modular program corresponding to the new part.

Figure 8:
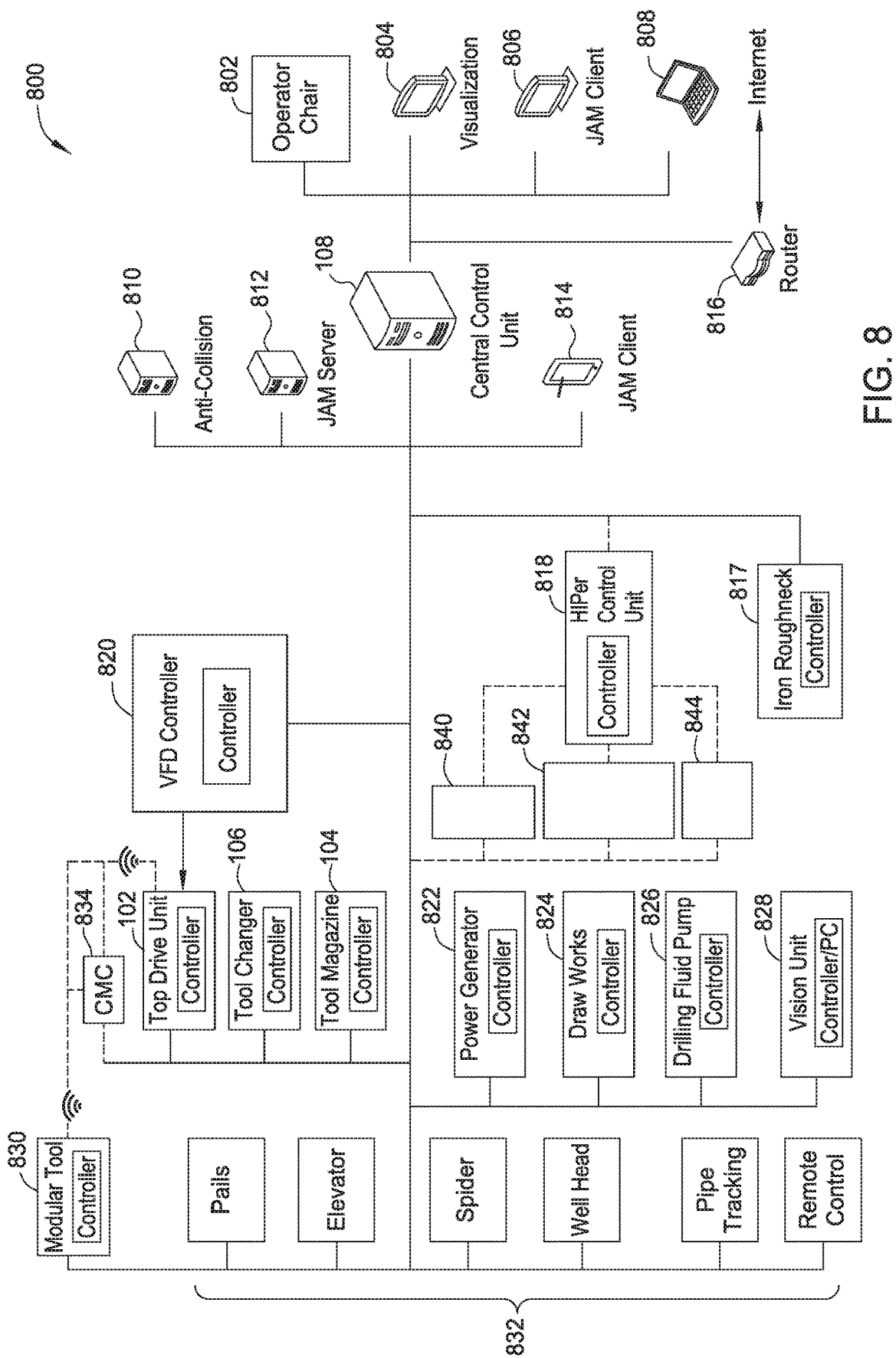
FIG. 8 is a schematic connection diagram of a modular top drive system according to one embodiment of the present disclosure.

FIG. 8 is a schematic connection diagram of a modular central control system 800 according to one embodiment of the present disclosure. The modular central control system 800 may include the central control unit 108 connected to various tools and parts. As described in FIG. 1, the central control unit 108 may be connected to the top drive unit 102, the tool storage unit 104, and the tool change unit 106 to facilitate automatic tool identification and automatic tool exchange.

The central control unit 108 may be one or more computers or one or more programmable logic controllers. The central control unit 108 may be connected to a driller chair 802, where a drilling operator can input operational commands. The driller chair 802 may include various input devices, such as a control panel having one or more control buttons, a keyboard, a joystick, or a microphone.

The central control unit 108 may also connected to a display unit 804, such as a monitor screen. The display unit 804 may be used to provide visualization for the drilling operator to make control decisions.

In one embodiment, the modular central control system 800 may include a JAM (Joint Analysis and Makeup) server 812, and one or more JAM clients 806, 812 connected to the central control unit 108. The JAM server 812 and JAM clients 806, 812 may be used to provide rotation and torque control during operation. In one embodiment, the JAM server 812 may be a stand-alone computer connected to the central control unit 108. The JAM server 812 may include a storage unit for storing data for operations, such as data for each makeup or break out. Alternatively, the JAM server 812 may be a storage unit in the central control unit 108. The JAM client 806 may be a terminal computer disposed near the driller chair 802 to allow the drilling operator to operate at the driller chair 802. The JAM client 814 may be a mobile unit, such as a tablet, that allows JAM operations at flexible locations.

In one embodiment, the central control unit 108 may be connected to a mobile unit 808. The mobile unit 808 allows the operator to operate and control the system away from the driller chair 802.

In one embodiment, the central control unit 108 may be connected to a router 816. The router 816 allows components of the modular control system 800 to connect with the Internet. The router 816 also enables remote support to all components of the modular control system 800 from locations away from the modular control system 800.

In one embodiment, the central control unit 108 may be connected to an anti-collision unit 810 configured to prevent any collision among different tools and parts. In one embodiment, the anti-collision unit 810 may be a stand-alone controller, such as a stand-alone computer. Alternatively, the anti-collision unit 810 may be integrated in the central control unit 108.

The central control unit 108 may be connected to a power tong positioning and controlling unit 818 to interact with power tongs 840, a stab master 842, a positioning device 844 on the rig. In one embodiment, the power tong positioning and controlling unit 818 may be the HiPer Control System by Weatherford, Inc. The power tong positioning and controlling unit 816 may be connected to the power tongs 840, the stab master 842, and the positioning device 844 by wire. The power tong and controlling unit 818 may be controlled wirelessly. Alternatively, the power tongs 840, the stab master 842, and the positioning device 844 may be controlled directly by the central control unit 108 without the power tong positioning and control unit 818. The central control unit 108 may also be connected to an iron roughneck unit 817 having with an onboard controller.

As shown in FIG. 8, the central control unit 108 may be connected to the top drive unit 102, the tool storage unit 104, and the tool change unit 106. When the top drive unit 102, the tool storage unit 104, or the tool change unit 106 includes a built-in controller, the central control unit 108 may communicate with the built-in controller.

In one embodiment, the central control unit 108 may be connected to a VFD (variable frequency drive) controller 820. The VFD controller 820 may be used to control the top drive unit 102.

The central control unit 108 may be connected to other devices on a drilling rig, such as a power generation unit 822, a drawworks unit 824, a drilling fluid pump 826, and a vision unit 828.

The central control unit 108 is also connected to one or more modular tools 830. In one embodiment, the modular tools 830 may include tools configured to selectively connect to the top drive unit 102, such as the drilling tool 200, the casing tool 240, and the cementing tool 270.

In one embodiment, a combined multi-coupler (CMC) 834 may be connected to the top drive unit 102. The combined multi-coupler 834 may be used to connect the modular tools 830 to the central control unit 108 and/or the top drive unit 102. The combined multi-coupler 834 may connect directly to the top drive unit 102. In one embodiment, the combined multi-coupler 834 may connect with the modular tools 830 when the modular tools 830 are directly coupled to the combined multi-coupler 834. In another embodiment, the combined multi-coupler 834 may connect with other units by wireless communication.

In one embodiment, the combined multi-coupler 834 is configured to make multiple connections, such as connections for axial and/or torsional loads, bore fluid, pressure fluid, electric power, and analytic and/or digital data. The combined multi-coupler 834 may include a load transfer feature corresponding to a load transfer feature on a tool so that the combined multi-coupler 834 may transfer axial and/or torque loads to the tool connected. The combined multi-coupler 834 may also include a seal profile to seal with a tool to transfer bore fluid to and from the tool. The combined multi-coupler 834 may further include one or more couplers for transfer pressured fluid, electric power, data, or other signals.

In one embodiment, when a tool, such as modular tools 830, is connected to the top drive unit 102 through the combined multi-coupler 834, identification information of the tool may be sent to the central control unit 108 through the combined multi-coupler 834. The tool identification information may be transfer through a data coupler, an electric power coupler, or other suitable connections in the combined multi-coupler 834 to the central control unit 108.

The central control unit 108 may also connect to a plurality of rig tools 832, such as bails, tongs, spiders, wellheads, pipe tracking units, remote controls, and the like.

It should be noted that the various parts and tools in FIG. 8 may be connected by wired connection and/or wireless connection. The central control unit 108 may communicate with various tools and units by wired communication or wireless communication.

Figure 9:
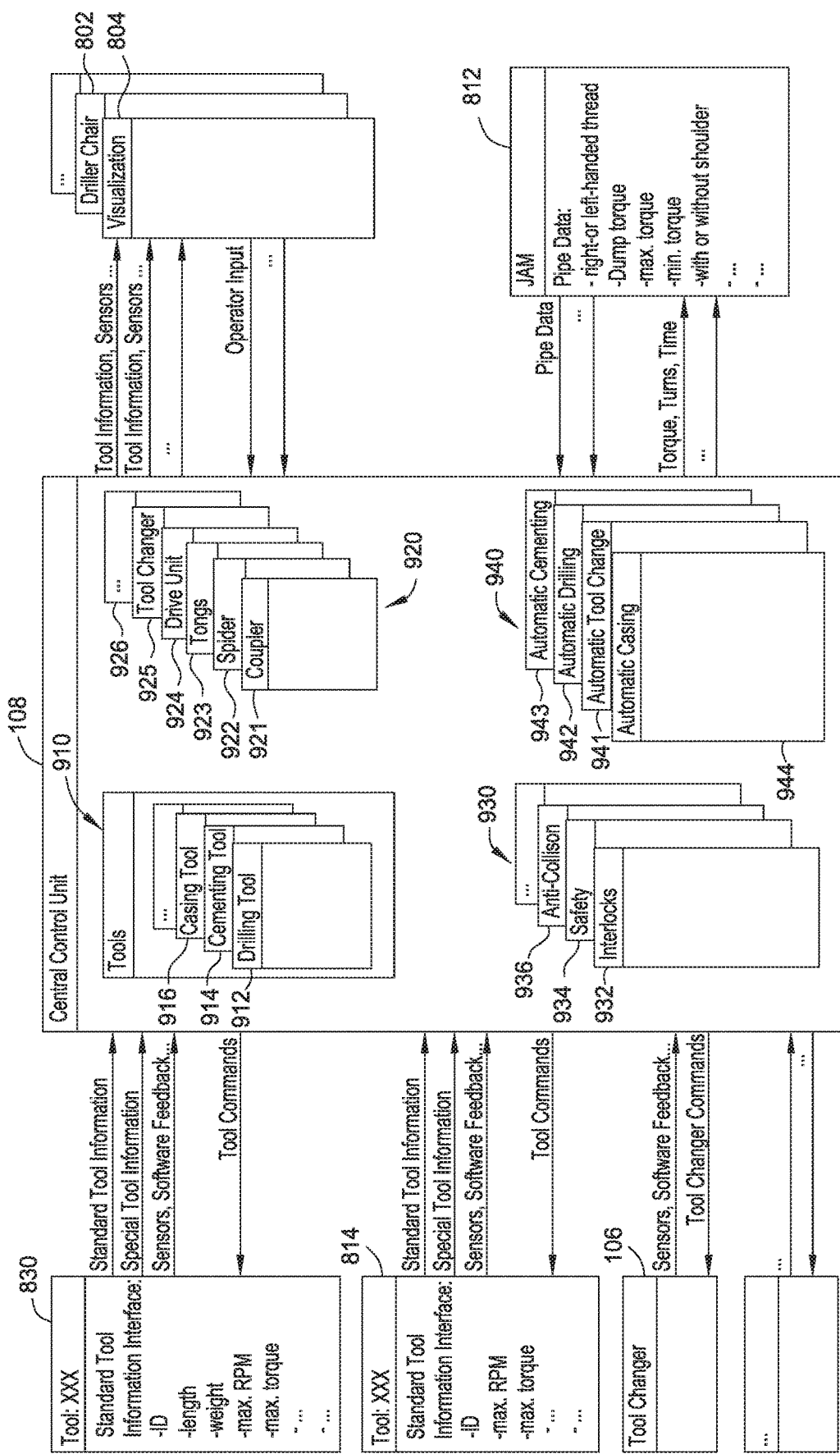
FIG. 9 is a schematic software diagram of a central control system according to one embodiment of the present disclosure.

FIG. 9 is a schematic software diagram showing connection of the central control unit 108 according to one embodiment of the present disclosure. The central control unit 108 may include computer software installed on a storage media, such as a hard drive. The computer software may be run by a controller of the central control unit 108 to perform desired control and processing tasks.

The central control unit 108 may have an add-on tool group 910 including software modules configured to communicate with and/or control add-on tools, such as modular tools 830. The add-on tool group 910 may include a drill tool module 912 configured to communicate with and/or control a drill tool, such as the drill tool 200. The add-on tool group 910 may include a cementing tool module 914 configured to communicate with and/or control a cementing tool, such as the cementing tool 270. The add-on tool group 910 may also include a casing tool module 916 configured to communicate with and/or control a casing tool, such as the casing tool 240.

In one embodiment, the software modules in the add-on tool group 910 may be selectively loaded when a corresponding tool is connected to the system. For example, a drill tool module 912 may be loaded when the drill tool 200 is attached to the top drive unit 102. In one embodiment, the software modules in the add-on tool group 910 may be downloaded from a remote location, for example, through Internet, and then activated when the corresponding modular tools are connected to the system. Alternatively, a software module for a modular tool may be pre-installed in the add-on tool group 910 and only activated when the modular tool is connected to the system. When a modular tool is disconnected from the system, the corresponding software module may be removed or deactivated from the add-on tool group 910.

The central control unit 108 may have a standard tool module group 920 including software modules configured to control tools that are standard or permanent to a system, such as a drilling rig. In one embodiment, the standard tool module group 920 may include a coupler module 921, a spider module 922, a tong module 923, a drive unit module 924, a tool changer module 925, a tool storage module 926, or any modules for similar tools. The software modules in the standard tool module group 920 may remain active during operation.

The central control unit 108 may have a safety module group 930 including software modules configured to monitor and maintain the safety during operation. For example, the safety module group 930 may include an interlocks module 932, a safety module 934, an anti-collision module 936, or any software module configured to perform safety functions. The software module in the safety module group 930 may coordinate among two or more tools in the system to ensure safety and prevent interference among different tools.

The central control unit 108 may have an operation module group 940 including software modules configured to automatically perform a particular operation with different tools. The operation module group 940 may include an automatic tool change module 941, an automatic drilling module 942, an automatic cementing module 943, an automatic casing module 944, or any operations that the system is configured to run.

The software module in the operation module group 940 may be selectively loaded or activated when a particular operation is scheduled to run. For example, the automatic drilling module 942 is loaded or activated when the system is to perform a drilling operation. In one embodiment, the software modules in the operation module group 940 may be customized or exchanged according to the particular operation requirements.

The central control unit 108 may run one or more software modules to communicate and/or control various tools and parts in the system through the connections between the central control unit 108 and the tools and parts. As discussed above, the connections may be wired connection, wireless connection, or combinations thereof. The connections may be direct connection or indirect connections.

The central control unit 108 may communicate with the operator by sending information of the tools and parts, such as, the information from the modular tools, standard tools, the sensors, or the like, in the system to the display unit 804 where the information can be visualized for the operator to observe. The central control unit 108 also receives operator inputs from the driller chair 802, the laptop 808, or other input devices, and plugs the operator inputs to the software modules to implement the operator's commands.

The central control unit 108 may communicate with the JAM server 812 or the JAM client 814 to monitor and control the rotation and torque during operation. For example, the central control unit 108 receives pipe data from JAM client 814, processes the received data through the relevant software module(s), and sends torque, turn, and time to the JAM server 812 or JAM client.

When a tool, such as the standard tool 830, is connected to the central control unit 108, the tool 830 may send various information, such as standard tool information, special tool information, feedback from sensors or software on the tool, to the central control unit 108, where the information may be processed using the relevant software modules, and tool commands are sent back to the tool 830 to implement tool control.

To control a standard tool 814, such as a tong, the central control unit 108 receives information of the standard tool and any feedback from the sensors or onboard software, processes the information through relevant software module, such as the tong module 923 for the tong, and sends commands to the tool.

To control units having integrated controller, such as the tool change unit 106, the central control unit 108 may not require information of the tool. The central control unit 108 may only require feedback from the software or sensor on the tool change unit 106.

Figure 10A:
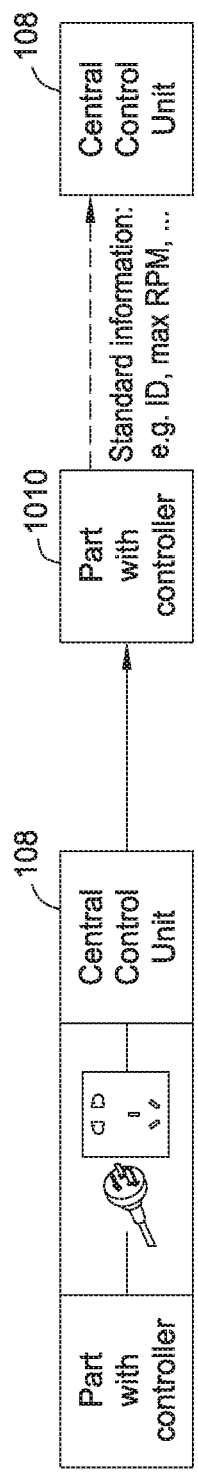
FIGS. 10A-10B are schematic diagrams of communication between a passive tool and the central control system.

FIG. 10A is a schematic diagram of communication between an active tool 1010 and the central control unit 108 when the active tool 1010 is connected to the central control unit 108. The active tool 1010 may be a tool or part having a controller, such as a microcontroller. The controller in the active tool may run a control program for controlling the active tool 1010. The active tool may also include a storage medium where the control program and tool information are stored.

When the active tool 1010 gets connected to the central control unit 108, the controller in the active tool 1010 will send the identification information to the central control unit 108. Alternatively, the active tool 1010 may be identified by an identification tag, such as an RFID tag. Upon receiving the identification of the active tool 1010, a software module corresponding to the active tool 1010 may be loaded or activated in the central control tool 108. The central control unit 108 can then either read standard information stored in the active tool 1010 or the active tool 1010 can send the standard information to the central control unit 108. The standard tool information may include the identification number of the tool, the operation parameters of the active tool 1010, such as the maximum allowed RPM, the maximum torque, and dimension of the active tool 1010.

A software module in the central control unit 108 for an active tool, such as the active tool 1010, mainly includes commands to the active tool and processes software and/or sensor feedback from the active tool. The controller in the active tool 1010 handles the hardware interaction. From the point of view of the central control unit 108, the active tool 1010 is a black box. Communication between the active tool 1010 and the central control unit 108 is implemented by a predefined software interface.

Figure 10B:
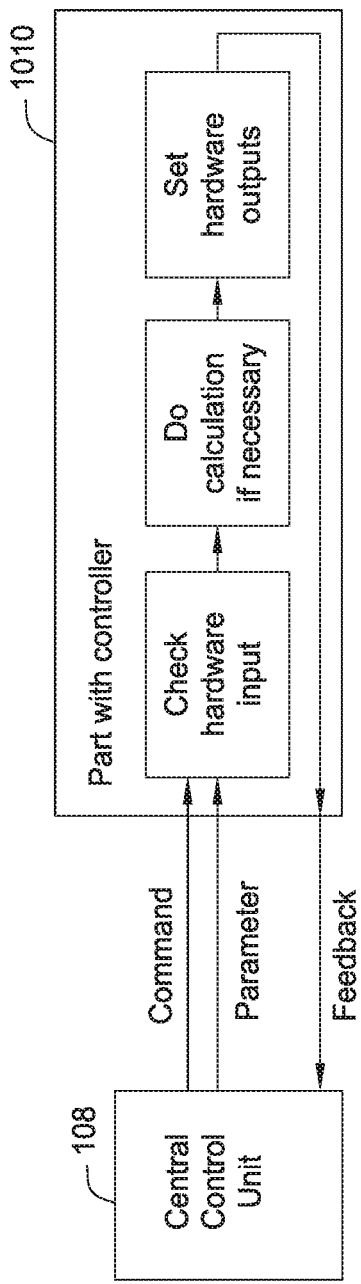

FIG. 10B is a schematic diagram of communication between the active tool 1010 and the central control unit 108 during operation. The central control unit 108 sends commands to the active tool 1010. The controller in the active tool 1010 will function to check the received commands according to the hardware of the active tool, perform any calculations if necessary, and output the commands to the hardware of the active tool 1010 accordingly. The controller of the active tool 1010 may then send feedback to the central control unit 108 through the software interface.

Figure 11A:
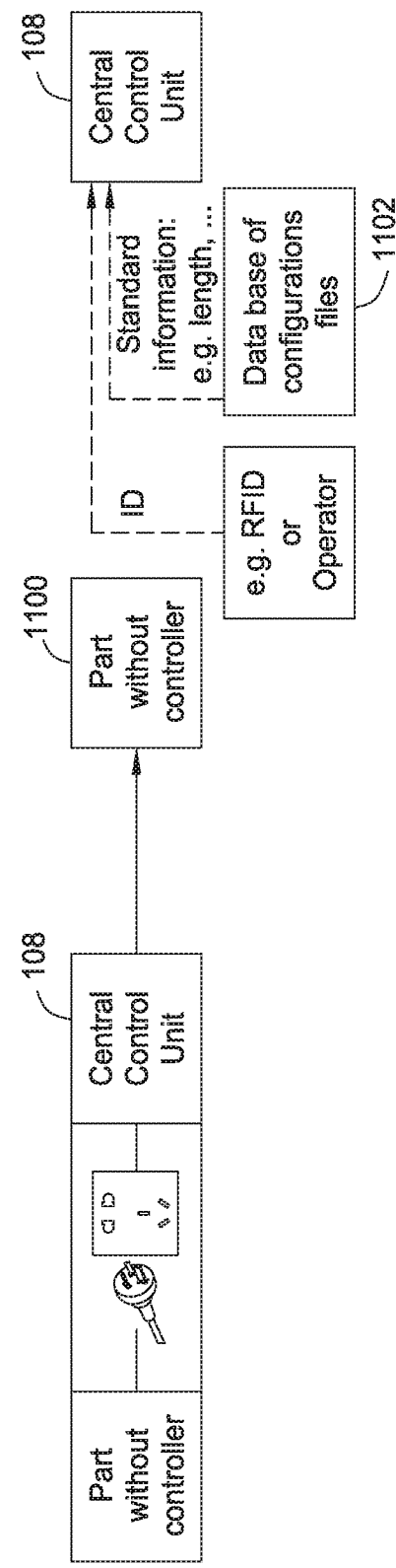
FIGS. 11A-11B are schematic diagrams of communication between an active tool and the central control system.
Figure 11B:
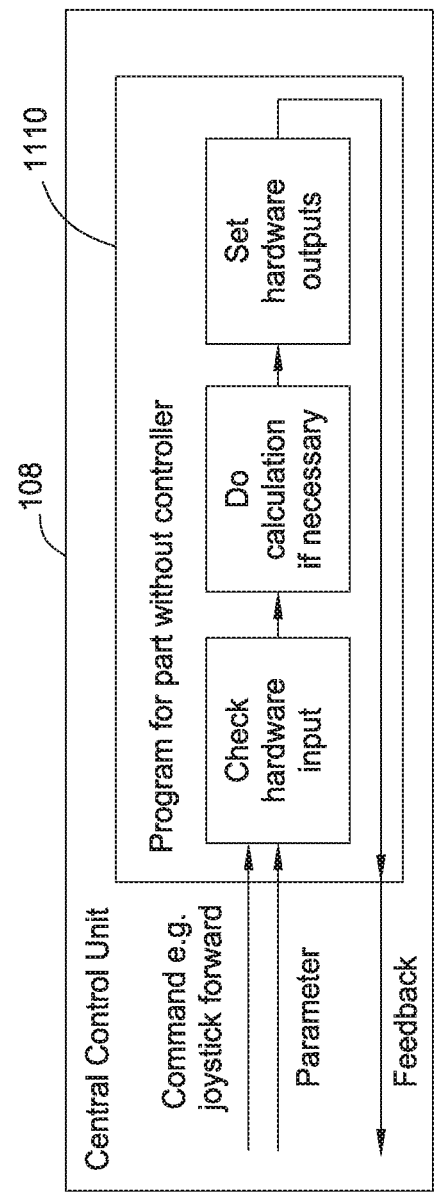

FIGS. 11A-11B are schematic diagrams of communication between a passive tool 1100 and the central control unit 108. The passive tool 1100 does not have a controller. For example, bails are typically a passive tool. In one embodiment, the passive tool 1100 may include an identification device, such as a RFID.

As shown in FIG. 11A, when the passive tool 1100 is connected to the system, the passive tool 1100 may be identified by the identification device and the identification information of the passive tool 1100 stored in the identification device may be sent to the central control unit 108. Alternatively, the identification information of the passive tool 1100 may be entered to the central control unit 108 by the operator. Standard information of the passive tool may be retrieved from a database 1102 of configuration files. The database 1102 may be stored in the central control unit 108 or stored in a remote location.

Interaction with the hardware of a passive tool, such as the passive tool 1100, may be handled by a software module in the central control unit 108. In one embodiment, the central control unit 108 may load or activate the corresponding software module according to the identification information. FIG. 11B is a schematic diagram of controlling the passive tool 1100. A software module 1110 may be used to control the hardware of the passive tool 1100. During operation, the software module 1110 may receive commands, for example from other software modules in the central control unit 108. The software module 1110 may check the received command, do calculation of necessary, and output the hardware command accordingly. Upon completing the hardware interaction, the software module 1110 may send feedback to the corresponding software modules in the central control unit 108.

Figure 12A:
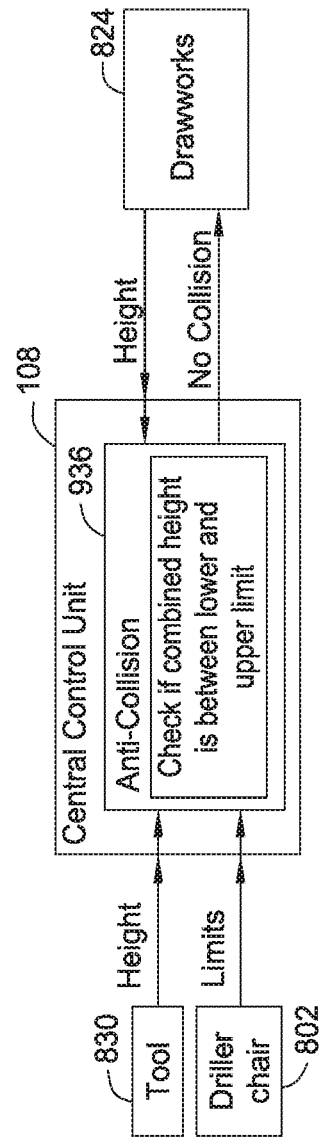
FIG. 12A is schematic diagram of an anti-collision procedure.

Some software modules in the central control unit 108 may interact with two or more tools and parts. FIG. 12A is a schematic diagram of an antic-collision procedure wherein the central control unit 108 communicates with the tool 830, the driller chair 802, and the drawworks unit 824. When connecting the tool 830 to the system, the anti-collision module 936 in the central control unit 108 may be invoked to prevent collision among the parts, for example the collision between the bottom and the tool 830 connected to the top drive unit 102. The anti-collision module 936 may calculate the position of the top drive unit 102 connected with the tool using the position given by the drawworks unit 824 and the dimension of the tool. The anti-collusion module 936 may obtain information of tool height from the tool 830. The operator may enter upper and lower limits through the driller chair 802. The drawworks unit 824 may send height information to the central control unit 108 and the anti-collision module 936. The anti-collision module 936 may calculate combined the height of the tool and the top drive unit 102 and check if the combined height is between the lower and the upper limits. If the combined height is within the limits, the anti-collision module 936 will send a non-collision signal to the drawworks unit 824 to give the drawworks unit 824 the permission to move the top drive unit 102.

Figure 12B:
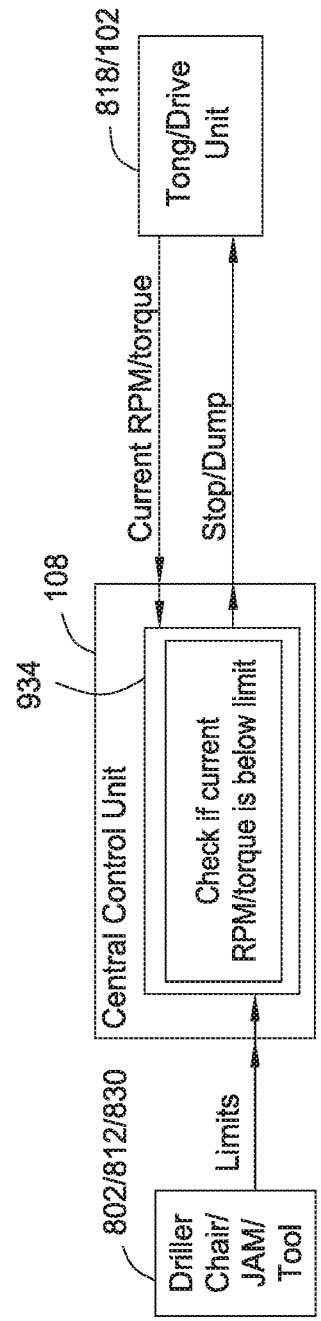
FIG. 12B is schematic diagram of a torque control procedure.

FIG. 12B is a schematic diagram of a torque control procedure performed in the central control unit 108. During operation, limits of RPM and/or limits of torque may be sent to the central control unit 108 by the operator through the driller chair 802, the JAM client 814, and/or by the tool 830. The power tong positioning and controlling unit 818 and/or the top drive unit 102 may send the current RPM and/or current torque to the central control unit 108. The central control unit 108 checks if the current RPM and/or current torque is within the limits. If the current RPM and/or current torque exceed the limits, the central control unit 108 sends a stop/dump command to the power tong positioning and controlling unit 818 and/or the top drive unit 102.

Embodiment of the present disclosure includes a tool for construction of a wellbore. The tool includes a coupling for connecting to a top drive unit by a friction structure or by a load bearing head, and one or more identification devices including identification information.

The coupling may include a head having a latching profile to selectively connect the tool to the top drive unit. The coupling may further include a lifting shoulder allowing a tool changer to lift the tool, and a neck extending between the head and the lifting shoulder.

The one or more identification devices may be one of a radio frequency identification device (RFID), a bar code tag, and a text tag.

The tool may include two or more identification devices disposed at intervals on an outer surface of the lifting shoulder. The one or more identification devices may be active identification device powered by an external power supply, hydraulically generated power, or battery.

The tool may further include one or more conductive pads connected to the one or more identification devices. The one or more conductive pads are configured to connect the one or more identification devices to a power supply and/or an input/output interface of a controller. In one embodiment, the one or more identification devices may be powered by the external power supply through a wireless connection.

The tool may be a drilling tool, a casing tool, a cementing tool, a completion tool, a fracturing tool, a pump, a sand screen, a clamping tool, an internal gripping tool, an external gripping tool, an adaptor, or a combination thereof.

The one or more identification devices may include a micro-controller, and a memory unit programmable to store identity information, and/or operational information. The one or more identification devices may further include an interface to communicate with a central control unit. The memory unit is re-writeable.

Embodiment of the present disclosure may include a top drive unit for construction of a wellbore. The top drive includes a drive body, a drive motor having a stator connected to the drive body, a coupler torsionally connected to a rotor of the drive motor for selectively connecting a tool, and an identification reader configured to obtain identity information from an identification device on the tool.

The coupler may have a latch profile for selectively connection with the tool. The coupler may be coupled to the tool by a friction structure or by a load bearing head.

The identification reader may be one of a radio frequency identification device reader, a barcode reader, and a camera. The identification reader may be powered by at least one of an external power supply, hydraulically generated power, and battery. The identification reader may include one or more connection pads configured to connect an identification device on the tool to a power supply and/or an input/output interface of a system controller. The identification reader may be powered by an external power supply using a wireless connection. The identification reader may be connected to a central control unit.

Another embodiment provides a tool change unit. The tool change unit includes a tool holder configured to lift a tool, a drive assembly configured to move the tool holder, and an identification reader configured to obtain identity information from an identification device on the tool.

The drive assembly may include a base mountable to a subfloor structure of a drilling rig, a post extending from the base to a height above a floor of the drilling rig, a slide hinge transversely connected to the post, and an arm connected to the slide hinge, wherein the tool holder is attached to the arm.

The identification reader may be attached to the tool holder. The identification reader may be one of a radio frequency identification device reader, a barcode reader, and a camera. The identification reader may be powered by an external power supply, hydraulically generated power, or battery.

The identification reader may include one or more connection pads configured to connect an identification device on the tool to a power supply and/or an input/output interface of a system controller. The identification reader may be powered by an external power supply by a wireless connection.

Another embodiment of the present disclosure provides a tool storage unit. The tool storage unit includes a frame having one or more parking spots, wherein each parking spot is configured to receive one of a drilling tool, a casing tool, a cementing tool, a fracturing tool, a pump, a sand screen, a clamping tool, an internal gripping tool, an external gripping tool, an adaptor, or a combination thereof, and an identification reader configured to obtain identity information from identification devices on tools in the parking spots.

The identification reader may be one of a radio frequency identification device reader, a barcode reader, and a camera. The identification reader may be powered by an external power supply, hydraulically generated power, or battery. The identification reader may include one or more connection pads configured to connect an identification device on the tool to a power supply and/or an input/output interface of a system controller. The identification reader may be powered by an external power supply by a wireless connection.

The tool storage unit may further include a rack. The rack may include a base, a beam, and two or more columns connecting the beam and the base, wherein the one or more parking spots are formed on the beam. Alternatively, the rack may include a disk, wherein the one or more parking spots are formed on the disk, a turntable configured to rotate the disk, and a shaft supporting the disk.

Another embodiment of the present disclosure provides a modular top drive system. The modular top drive system includes a top drive unit for selectively connecting to a tool using a friction structure, a threaded connection, or a load bearing head, and an identification reader configured to obtain identity information from identification devices.

The modular top drive system may further include a tool storage unit having one or more parking spots, wherein each parking spot is configured to receive and support a tool.

The modular top drive system may further include a tool change unit configured to transfer tools between the top drive unit and the tool storage unit.

In the modular top drive system, the identification reader may be disposed on the top drive unit, a tool storage unit, or a tool change unit. Alternatively, the identification reader may be disposed on the tool and configured to read identification devices disposed on the top drive unit, the tool storage unit, or the tool change unit.

The modular top drive system further includes a central control unit, wherein the identification reader is connected to the central control unit.

The modular top drive unit may selectively connect to a drilling tool, a casing tool, a cementing tool, a fracturing tool, a pump, a sand screen, a clamping tool, an internal gripping tool, an external gripping tool, an adaptor, or a combination thereof.

The modular top drive system may further include one or more tools including an identification device, wherein the one or more tools are selectively connected to the central control unit.

In the modular top drive system, the identification reader may be one of a radio frequency identification device reader, a barcode reader, and a camera. The identification reader may be powered by an external power supply, hydraulically generated power, or battery.

The identification reader may include one or more connection pads configured to connect an identification device on the tool to a power supply and/or an input/output interface of a central control unit.

In the modular top drive system, the identification reader may be powered by an external power supply by a wireless connection.

Another embodiment of the present disclosure provides a method for operating a modular top drive system. The method includes positioning a tool within a range of an identification reader, reading one or more identification devices on the tool using the identification reader to confirm the tool is the correct tool, and engaging the tool to a top drive unit.

In the method, positioning the tool may include transporting the tool to slips positioned underneath the top drive unit. In the method, engaging the tool to the top drive unit may include moving the top drive unit down towards the slips.

In the method, positioning the tool may include retrieving a tool from a tool storage unit, and transporting the tool to slips positioned underneath the top drive unit.

In the method, positioning the tool may include retrieving a tool from a tool storage unit using a tool change unit, and transferring the retrieved tool towards a top drive unit using the tool change unit.

In the method, confirming the tool may include, prior to retrieving the tool, identifying one or more tools stored in the tool storage unit using the identification reader in the tool storage unit.

In the method, confirming the tool may include identifying the retrieved tool using the identification reader in the top drive unit when the retrieved tool is transferred adjacent the top drive unit, and if the retrieved tool is not the correct tool, returning the retrieved tool to the storage unit, and retrieving another tool.

In the method, confirming the tool may include, prior to retrieving the tool, identifying one or more tools stored in the tool storage unit using an identification reader in an tool change unit, and retrieving the tool with the tool change unit upon confirming the identification of the tool.

The method may further include sending information of the tool to a central control unit. The method may further include activating a software module corresponding to the tool in the central control unit, and sending command to the tool from the central control unit.

In the method, confirming the tool may include sending tool identity information to a central control unit.

In the method, confirming the tool may include one of reading a radio frequency identification device, reading a barcode, capturing an image of a text tag and recognizing the text tag, and receiving identity information from an active identification device. Confirming the tool may further include determining whether the tool is correct within the identification reader.

The method further includes receiving operation history of the tool from an identification device on the tool. The method further includes updating operation history in the identification device on the tool upon engaging the tool. The method further includes replacing the tool with another tool.

In the method, the tool may be one of a drilling tool, a casing tool, a cementing tool, a fracturing tool, a pump, a sand screen, a clamping tool, an internal gripping tool, an external gripping tool, an adaptor, or a combination thereof.

While the foregoing is directed to embodiments of the present disclosure, other and further embodiments of the disclosure may be devised without departing from the basic scope thereof, and the scope of the invention is determined by the claims that follow.

The invention claimed is:

1. A method of operating a modular top drive system, comprising:
positioning a tool adjacent a top drive unit and within a range of an identification reader, wherein positioning the tool comprises:
retrieving the tool from a tool storage unit; and
transporting the tool to a plurality of slips positioned underneath the top drive unit;
reading one or more identification devices on the tool using the identification reader;
determining whether the tool is a correct tool using a tool identification information obtained from the one or more identification devices;
if the tool is the correct tool,
configuring the top drive unit according to the tool identification information; and
engaging the tool to the top drive unit;
if the tool is not the correct tool, positioning another tool adjacent to the top drive unit.

2. The method of claim 1, further comprising:
prior to retrieving the tool, identifying one or more tools stored in the tool storage unit using a second identification reader in a tool change unit;
retrieving the tool with the tool change unit upon confirming the tool identification.

3. The method of claim 1, further comprising:
sending the tool identification information to a central control unit.

4. The method of claim 3, wherein configuring the top drive unit comprises sending a command to the top drive unit from the central control unit.

5. The method of claim 3, further comprising:
activating a software module in the central control unit corresponding to the tool; and
sending a command to the tool from the central control unit.

6. The method of claim 1, further comprising using the tool to perform at least one of a drilling operation, a casing operation, a cementing operation, a completion operation, a logging operation, a fracturing operation, and an oil recovery operation.

7. A modular top drive system, comprising:
a top drive unit for selectively connecting to a tool;

an identification reader configured to obtain identity information from identification devices in the tool;

a connection pad positioned on an exterior surface of the top drive unit, wherein the connection pad is configured to provide electrical power to the identification devices in the tool connected to the top drive unit; and a central control unit connectable to the top drive unit and the identification reader.

8. The modular top drive system of claim 7, wherein the identification reader is disposed on the top drive unit.

9. The modular top drive system of claim 7, further comprising:

a tool storage unit; and a tool change unit, wherein the identification reader is disposed on the top drive unit, the tool storage unit, or the tool change unit.

10. The modular top drive system of claim 7, wherein the identification reader is one of a radio frequency identification device reader, a barcode reader, and a camera.

11. The modular top drive system of claim 7, wherein the top drive unit selectively connects to the tool using a friction structure, a threaded connection, or a load bearing head.

12. A tool for construction of a wellbore, comprising:

a coupling for connecting to a top drive unit by a friction structure or by a load bearing head;

one or more identification devices including identification information of the tool; and a conductive pad positioned on an exterior surface of the coupling, the conductive pad is connected to the one or more identification devices by a wire;

wherein the one or more identification devices are active identification device powered by an external power supply through the conductive pad and the wire.

13. The tool of claim 12, wherein the one or more identification devices are two or more identification devices disposed at various locations on the coupling.

14. The tool of claim 12, wherein the tool is a drilling tool, a casing tool, a cementing tool, a completion tool, a fracturing tool, a pump, a sand screen, a clamping tool, an internal gripping tool, an external gripping tool, an adaptor, or a combination thereof.

15. The tool of claim 12, wherein the one or more identification devices includes:

a micro-controller; and a memory unit programmable to store identity information, and/or operational information.

16. The tool of claim 15, wherein the one or more identification devices further includes an interface to communicate with a central control unit.

17. The tool of claim 12, wherein the one or more identification devices include a wireless transmitter.

18. The tool of claim 12, wherein the one or more identification devices are configured to send signals to an external unit through the conductive pad.

19. A method of operating a modular top drive system, comprising:

positioning a tool adjacent a top drive unit and within a range of an identification reader;

reading one or more identification devices on the tool using the identification reader to obtain a tool identification information;

sending the tool identification information to a central control unit;

determining whether the tool is a correct tool using the tool identification information;

if the tool is the correct tool, configuring the top drive unit according to the tool identification information, wherein configuring the top drive unit comprises sending a command to the top drive unit from the central control unit; and engaging the tool to the top drive unit;

if the tool is not the correct tool, positioning another tool adjacent to the top drive unit.

20. The method of claim 19, further comprising:

activating a software module in the central control unit corresponding to the tool; and sending a command to the tool from the central control unit.

* * * * *